(12) United States Patent
Nomura et al.

(10) Patent No.: US 12,442,924 B2
(45) Date of Patent: Oct. 14, 2025

(54) SIGNAL PROCESSING DEVICE, SIGNAL PROCESSING METHOD, AND LIDAR DEVICE

(71) Applicant: Mitsubishi Electric Corporation, Tokyo (JP)

(72) Inventors: Junia Nomura, Tokyo (JP); Masaharu Imaki, Tokyo (JP); Shumpei Kameyama, Tokyo (JP); Yusuke Ito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 189 days.

(21) Appl. No.: 18/227,013

(22) Filed: Jul. 27, 2023

(65) Prior Publication Data

US 2023/0375706 A1 Nov. 23, 2023

Related U.S. Application Data

(63) Continuation of application No. PCT/JP2021/007241, filed on Feb. 26, 2021.

(51) Int. Cl.
*G01S 17/58* (2006.01)

(52) U.S. Cl.
CPC .................................. *G01S 17/58* (2013.01)

(58) Field of Classification Search
CPC .... G01S 7/4802; G01S 7/4808; G01S 7/4917; G01S 17/34; G01S 17/58; G01S 17/26; Y02A 90/10
See application file for complete search history.

(56) References Cited

U.S. PATENT DOCUMENTS

| | | | | |
|---|---|---|---|---|
| 6,580,497 | B1 * | 6/2003 | Asaka | G01S 7/493 |
| | | | | 356/28.5 |
| 2001/0016799 | A1 * | 8/2001 | Kitazumi | G01N 29/46 |
| | | | | 702/66 |
| 2001/0032514 | A1 * | 10/2001 | Maruyama | G01H 9/00 |
| | | | | 73/657 |
| 2007/0058156 | A1 * | 3/2007 | Ando | G01P 5/26 |
| | | | | 356/28 |

(Continued)

FOREIGN PATENT DOCUMENTS

| | | |
|---|---|---|
| EP | 3955028 A1 | 2/2022 |
| EP | 3955029 A1 | 2/2022 |

(Continued)

OTHER PUBLICATIONS

Yoshiki et al "Laser Radar Device", Oct. 29, 2020, WO2020217267 A1 (Year: 2020).*

(Continued)

*Primary Examiner* — Sang H Nguyen
(74) *Attorney, Agent, or Firm* — Birch, Stewart, Kolasch & Birch, LLP

(57) ABSTRACT

A signal processing device calculates, as a moving speed of each of a plurality of observation targets, a relative speed of each of the targets with respect to a lidar device. A plurality of light pulses having different frequencies from each other are generated, each of the light pulses radiated and then scattered by each of the targets is received, and multiplexed light of each of the scattered light and the laser beam is detected. The signal processing device includes: a Doppler frequency calculating unit to calculate a Doppler frequency in a frequency of each of the scattered light and due to movement of each of the targets from the frequencies of the plurality of generated light pulses and a detection signal of each of the multiplexed light; and a speed calculating unit to calculate a relative speed of each of the targets from each of the Doppler frequency.

8 Claims, 13 Drawing Sheets

(56) References Cited

U.S. PATENT DOCUMENTS

| | | | | |
|---|---|---|---|---|
| 2013/0226508 A1* | 8/2013 | Carpaij | ............... | G01S 17/58 |
| | | | | 702/142 |
| 2015/0241461 A1* | 8/2015 | Imaki | ............... | G01S 7/4813 |
| | | | | 356/28 |
| 2017/0153327 A1* | 6/2017 | Nishioka | ............... | G01S 17/58 |
| 2017/0242100 A1* | 8/2017 | Hinokuma | ............ | G01S 17/95 |
| 2018/0356440 A1* | 12/2018 | Kotake | ............... | G01F 1/661 |
| 2019/0032635 A1 | 1/2019 | Haraguchi et al. | | |
| 2020/0309950 A1 | 10/2020 | Imaki et al. | | |
| 2020/0309952 A1 | 10/2020 | Imaki et al. | | |
| 2021/0141067 A1 | 5/2021 | Haraguchi et al. | | |
| 2021/0356590 A1 | 11/2021 | Noguchi | | |

FOREIGN PATENT DOCUMENTS

| | | |
|---|---|---|
| JP | 5660973 B2 | 1/2015 |
| WO | WO 2017/134821 A1 | 8/2017 |
| WO | WO 2018/189863 A1 | 10/2018 |
| WO | WO 2020/079776 A1 | 4/2020 |
| WO | WO 2020/209279 A1 | 10/2020 |

OTHER PUBLICATIONS

Lonnqvist "Laser Doppler Velocimeter With Edge Filter Demodulation", Oct. 16, 2014, WO 2014167175 A1 (Year: 2014).*
Extended European Search Report for European Application No. 21927863.7, dated Feb. 6, 2024.
European Communication pursuant to Article 94(3) EPC for European Application No. 21 927 863.7, dated Nov. 15, 2024.
"Laser Safety Guidebook", Edited by Optoelectronics Industry and Technology Development Association, New Technology Communications Publishing Co., 4th Edition, Sep. 2006, p. 49-62, total 17 pages.
International Search Report, issued in PCT/JP2021/007241, dated May 11, 2021.

* cited by examiner

SIGNAL PROCESSING DEVICE, SIGNAL PROCESSING METHOD, AND LIDAR DEVICE

CROSS REFERENCE TO RELATED APPLICATIONS

This application is a Continuation of PCT International Application No. PCT/JP2021/007241 filed on Feb. 26, 2021, which is hereby expressly incorporated by reference into the present application.

TECHNICAL FIELD

The present disclosure relates to a signal processing device, a signal processing method, and a lidar device.

BACKGROUND ART

Among the lidar devices, there is a lidar device (hereinafter referred to as a "conventional lidar device") that calculates moving speeds of a plurality of observation targets.

A conventional lidar device includes a light source that outputs a laser beam, a light pulse generating unit that generates light pulse from the laser beam, a transmission and reception unit that repeatedly radiates the light pulse to a space and receives each light pulse scattered by each observation target as scattered light, and an optical multiplexing unit that detects multiplexed light of each scattered light and the laser beam. In addition, the conventional lidar device includes a signal processing unit that calculates a Doppler frequency due to movement of each observation target from an optical frequency of each multiplexed light detected by the optical multiplexing unit, and calculates a moving speed of each observation target from each Doppler frequency. The moving speed calculated by the signal processing unit is a moving speed of the laser beam in the radiation direction.

Meanwhile, Patent Literature 1 discloses a distance measuring device that calculates a distance from the distance measuring device to an observation target on the basis of a time from radiation of light pulse to reception of scattered light that is light pulse scattered by the observation target.

The distance measuring device includes a generation unit that generates a plurality of light pulses, a transmission unit that radiates each of the slight pulse generated by the generation unit to a space, and a reception unit that receives each of the slight pulse scattered by the observation target as scattered light. Furthermore, the distance measuring device includes a distance calculating unit that calculates a distance to the observation target on the basis of a time from radiation of the light pulse from the transmission unit to reception of the scattered light by the reception unit. In a case where the distance to the observation target is long or the radiation cycle of the light pulse is short, there is a case where the transmission unit radiates light pulse having an (N+1)-th radiation order after the transmission unit radiates slight pulse having an N-th radiation order (N is an integer of 1 or more) and before the reception unit receives scattered light corresponding to the N-th light pulse. Even in such a case, the generation unit generates a plurality of slight pulse having different optical frequencies, and outputs the respective slight pulse to the transmission unit, in order to make it possible to recognize which order of the scattered light the scattered light received by the reception unit corresponds to.

CITATION LIST

Patent Literature

Patent Literature 1: International Publication No. 2020-079776

SUMMARY OF INVENTION

Technical Problem

The moving speed of an observation target (hereinafter referred to as a "far observation target") present far from the lidar device and the moving speed of an observation target (hereinafter referred to as a "near observation target") present near the lidar device may be the same. When the moving speed of the far observation target is the same as the moving speed of the near observation target, scattered light from the far observation target (hereinafter referred to as "far scattered light") and scattered light from the near observation target (hereinafter referred to as "near scattered light") may reach the lidar device in a state of overlapping each other.

In the conventional lidar device, when the transmission and reception unit receives each of the far scattered light and the near scattered light overlapping each other, the optical frequency of the far scattered light and the optical frequency of the near scattered light are the same frequency, and thus a signal processing unit cannot identify the far scattered light and the near scattered light. Therefore, there is a problem that the signal processing unit cannot detect the presence of the other observation target even if the signal processing unit can detect the presence of one of the near observation target and the far observation target and calculate the moving speed of the observation object.

The distance measuring device disclosed in Patent Literature 1 includes a generation unit that generates a plurality of light pulses having different optical frequencies. However, a distance calculating unit of the distance measuring device does not identify the far scattered light and the near scattered light when the far scattered light and the near scattered light overlap each other. Therefore, even if the distance measuring device is used in a conventional lidar device, the above problem cannot be solved.

The present disclosure has been made to solve the above-described problems, and it is an object of the present disclosure to provide a signal processing device and a signal processing method capable of calculating a moving speed of each observation target regardless of whether or not a moving speed of a far observation target and a moving speed of a near observation target are the same even in a state where far scattered light and near scattered light overlap each other.

Solution to Problem

A signal processing device according to the present disclosure calculates, as a moving speed of each of a plurality of observation targets present in a space, a relative speed of each of the observation targets with respect to a lidar device, wherein a plurality of light pulses having different optical frequencies are generated from a laser beam output from a light source, each of the light pulses radiated to the space and then scattered by each of the observation targets is received as scattered light, and multiplexed light of the scattered light and the laser beam is detected, and the signal processing device comprises:

a Doppler frequency calculator to calculate a Doppler frequency that is due to movement of each of the observation targets; and a speed calculator to calculate a relative speed of each of the observation targets from each of the Doppler frequency calculated by the Doppler frequency calculator, wherein the Doppler frequency calculator includes: an optical frequency corrector to correct an optical frequency of each of the multiplexed light on a basis of a frequency difference between an optical frequency of one light pulse and an optical frequency of the remaining light pulse among the plurality of generated light pulses; and a frequency calculation processor to calculate a Doppler frequency included in an optical frequency of each of the scattered light from an optical frequency of each of the multiplexed light corrected by the optical frequency corrector and an optical frequency of each of the generated light pulses.

Advantageous Effects of Invention

According to the present disclosure, even in a state where the far scattered light and the near scattered light overlap each other, the moving speed of each observation target can be calculated regardless of whether or not the moving speed of the far observation target and the moving speed of the near observation target are the same.

BRIEF DESCRIPTION OF DRAWINGS

FIG. 5 is a hardware configuration diagram of a computer in a case where the signal processing device 15 is implemented by software, firmware, or the like.

DESCRIPTION OF EMBODIMENTS

Hereinafter, in order to describe the present disclosure in more detail, embodiments for carrying out the present disclosure will be described with reference to the accompanying drawings.

First Embodiment

Figure 1:
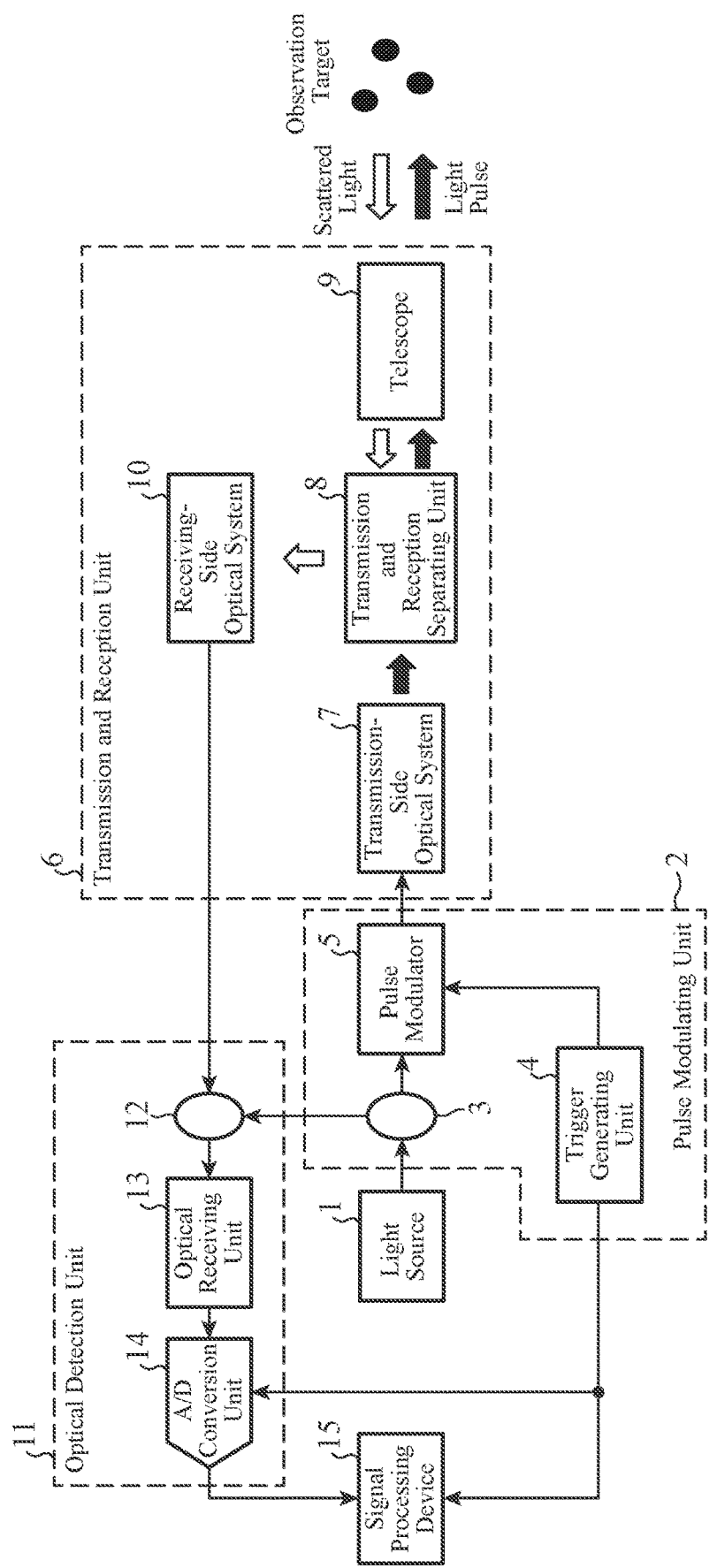
FIG. 1 is a configuration diagram illustrating a lidar device including a signal processing device 15 according to a first embodiment.

FIG. 1 is a configuration diagram illustrating a lidar device including a signal processing device 15 according to a first embodiment.

The lidar device illustrated in FIG. 1 includes a light source 1, a pulse modulating unit 2, a transmission and reception unit 6, an optical detection unit 11, and a signal processing device 15.

The lidar device calculates a relative speed of each observation target with respect to the lidar device as each moving speed of a plurality of observation targets present in a space. The observation target is a solid, a liquid, or a gas.

In the lidar device illustrated in FIG. 1, for the sake of simplicity of description, it is assumed that the number of observation objects is two, and one observation object is a first observation object and the other observation object is a second observation object. However, this is merely an example, and the number of observation targets may be three or more.

The light source 1 is, for example, a laser that emits a laser beam of a single frequency, and is implemented by a semiconductor laser, a fiber laser, or a solid-state laser whose emission spectrum has a line width of several MHz or less. Alternatively, the light source 1 is implemented by a combination of one or more lasers among a semiconductor laser, a fiber laser, and a solid-state laser.

The light source 1 outputs a laser beam that is continuous light to the pulse modulating unit 2. The optical frequency of the laser beam output from the light source 1 is $f_0$.

The pulse modulating unit 2 includes a light division unit 3, a trigger generating unit 4, and a pulse modulator 5.

The pulse modulating unit 2 generates a plurality of light pulses having different optical frequencies from the laser beam output from the light source 1.

When the plurality of light pulses generated by the pulse modulating unit 2 are, for example, two light pulses $P_1$ and $P_2$, the optical frequency of the light pulse $P_1$ is $f_0+f_{IF1}$, and the optical frequency of the light pulse $P_2$ is $f_0+f_{IF2}$. For example, $f_{IF2}>f_{IF1}$. The frequency difference $\Delta f$ ($=f_{IF2}-f_{IF1}$) between $f_{IF2}$ and $f_{IF1}$ is larger than twice the absolute value of the Doppler frequency generated when each of the first observation target and the second observation target moves at the assumed maximum speed. When the frequency difference $\Delta f$ is larger than twice the absolute value of the Doppler frequency, the optical frequencies of the plurality of scattered light beams to be described later are different from each other as long as each of the moving speeds of the first observation target and the second observation target is a speed within an assumed range.

When the plurality of light pulses generated by the pulse modulating unit 2 are M (M is an integer of 3 or more; and) light pulses $P_1, P_2, \ldots, P_M$, the optical frequency of the light pulse $P_m$ (m=1, 2, . . . , M) is $f_0+f_{IFM}$. For example, $f_{IFM}>f_{IF(M-1)}> \ldots >f_{IF1}$.

In the lidar device illustrated in FIG. 1, it is assumed that the pulse modulating unit 2 generates two light pulses $P_1$ and $P_2$ in order to simplify the description.

The light division unit 3 is implemented by, for example, a beam splitter, a fiber type coupler, or a half mirror.

The light division unit 3 divides the laser beam output from the light source 1 into two at a predetermined ratio. The predetermined ratio is, for example, a ratio of 2 on the pulse modulator 5 side and a ratio of 1 on the optical multiplexing unit 12 to be described later.

The light division unit 3 outputs one of the divided laser beams to the pulse modulator 5, and outputs the other of the divided laser beams to the optical multiplexing unit 12 as reference light.

The trigger generating unit 4 is implemented by, for example, a pulse generator, a function generator, or a field-programmable gate array (FPGA).

Figure 2:
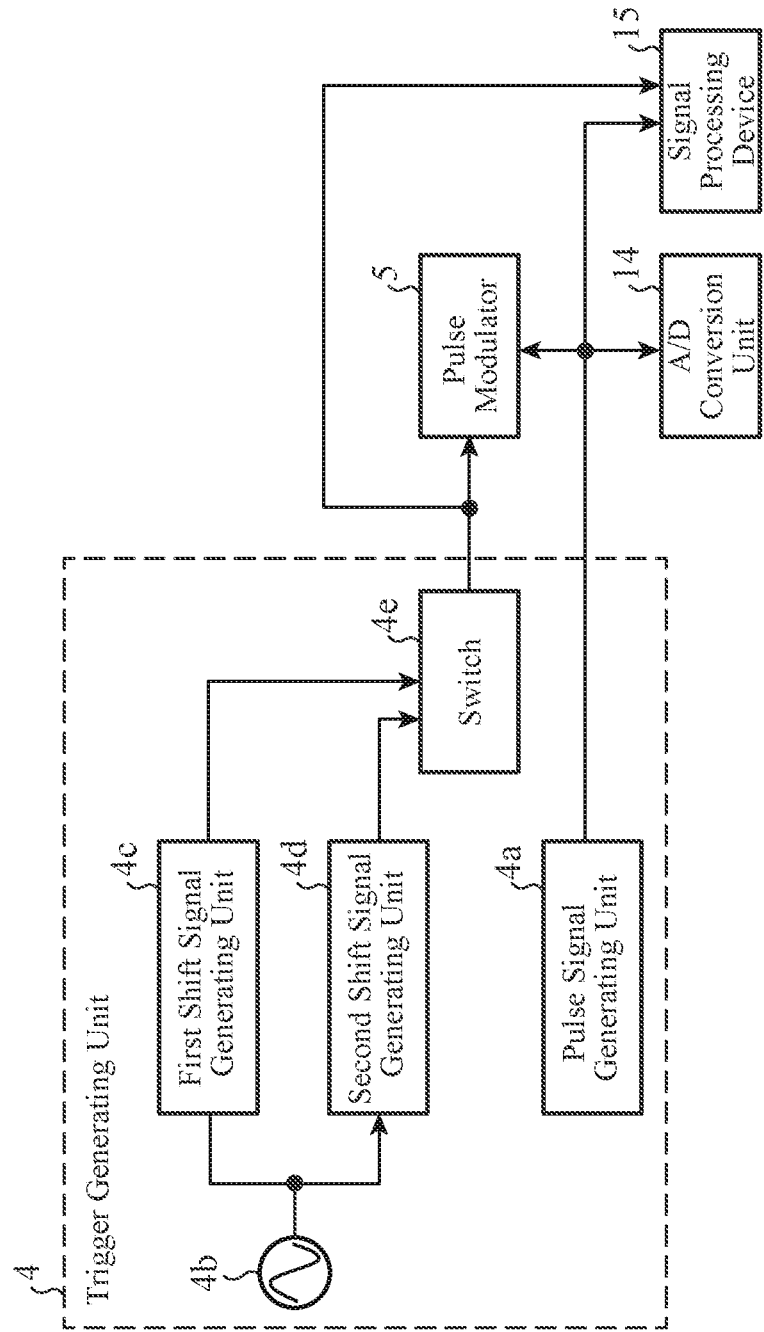
FIG. 2 is a configuration diagram illustrating the inside of a trigger generating unit 4.

As illustrated in FIG. 2, the trigger generating unit 4 includes a pulse signal generating unit 4a, a reference signal generating unit 4b, a first shift signal generating unit 4c, a second shift signal generating unit 4d, and a switch 4e.

The trigger generating unit 4 outputs a pulse signal to each of the pulse modulator 5, an analog-to-digital converter (hereinafter referred to as "A/D conversion unit") 14 to be described later, and the signal processing device 15.

In addition, the trigger generating unit 4 outputs a first frequency shift signal indicating the modulation frequency $f_{IF1}$ and a second frequency shift signal indicating the modulation frequency $f_{IF2}$ to each of the pulse modulator 5 and the signal processing device 15.

FIG. 2 is a configuration diagram illustrating the inside of the trigger generating unit 4.

The pulse signal generating unit 4a generates a pulse signal having a pulse width $\Delta T$.

The pulse signal generating unit 4a repeatedly outputs a pulse signal having a pulse width $\Delta T$ to each of the pulse modulator 5, the A/D conversion unit 14, and the signal processing device 15 at a period Trep.

The reference signal generating unit 4b generates a reference signal that is an electric signal of the frequency f.

The reference signal generating unit 4b outputs the reference signal to each of the first shift signal generating unit 4c and the second shift signal generating unit 4d.

The first shift signal generating unit 4c acquires the reference signal output from the reference signal generating unit 4b, and generates the first frequency shift signal indicating the modulation frequency $f_{IF1}$ from the reference signal.

The first shift signal generating unit 4c outputs the first frequency shift signal to the switch 4e.

The second shift signal generating unit 4d acquires the reference signal output from the reference signal generating unit 4b, and generates the second frequency shift signal indicating the modulation frequency $f_{IF2}$ from the reference signal.

The second shift signal generating unit 4d outputs the second frequency shift signal to the switch 4e.

The switch 4e sequentially outputs the first frequency shift signal output from the first shift signal generating unit 4c and the second frequency shift signal output from the second shift signal generating unit 4d to each of the pulse modulator 5 and the signal processing device 15.

The pulse modulator 5 is implemented by, for example, a modulation element using an acousto-optic element or a modulation element using a lithium niobate crystal, and an optical amplifier such as a semiconductor optical amplifier.

Each time the pulse modulator 5 receives a pulse signal having a pulse width $\Delta T$ from the pulse signal generating unit 4a, the pulse modulator 5 pulse-modulates the laser beam output from the light division unit 3 according to the pulse signal. That is, the pulse modulator 5 converts the laser beam that is continuous light into light pulse having a pulse width $\Delta T$.

In addition, when the first frequency shift signal is output from the switch 4e, the pulse modulator 5 shifts the optical frequency $f_0$ of the light pulse having the pulse width $\Delta T$ to the optical frequency $f_0+f_{IF1}$ to generate the light pulse $P_1$ having the optical frequency $f_0+f_{IF1}$.

The pulse modulator 5 outputs the light pulse $P_1$ to a transmission-side optical system 7.

When the second frequency shift signal is output from the switch 4e, the pulse modulator 5 shifts the optical frequency $f_0$ of the light pulse having the pulse width $\Delta T$ to the optical frequency $f_0+f_{IF2}$ to generate the light pulse $P_2$ having the optical frequency $f_0+f_{IF2}$.

The pulse modulator 5 outputs the light pulse $P_2$ to the transmission-side optical system 7.

The transmission and reception unit 6 includes a transmission-side optical system 7, a transmission and reception separating unit 8, a telescope 9, and a receiving-side optical system 10.

The transmission and reception unit 6 radiates the light pulses $P_1$ and $P_2$ generated by the pulse modulating unit 2 to the space.

The transmission and reception unit 6 receives the light pulse $P_1$ scattered by the first observation target as scattered light $R_1$, and receives the light pulse $P_1$ scattered by the second observation target as scattered light $R_2$.

The transmission and reception unit 6 receives the light pulse $P_2$ scattered by the first observation target as scattered light $R_3$, and receives the light pulse $P_2$ scattered by the second observation target as scattered light $R_4$.

When the first observation target moves in the radiation direction of the light pulses $P_1$ and $P_2$, the optical frequencies of the scattered light beams $R_1$ and $R_3$ include the Doppler frequency $f_{dp1}$ due to the movement of the first observation target. Therefore, the optical frequency of the scattered light $R_1$ is $f_0+f_{IP1}+f_{dp1}$, and the optical frequency of the scattered light $R_3$ is $f_0+f_{IP2}+f_{dp1}$.

When the second observation target moves in the radiation direction of the light pulses $P_1$ and $P_2$, the optical frequencies of the scattered light beams $R_2$ and $R_4$ include the Doppler frequency $f_{dp2}$ due to the movement of the second observation target. Therefore, the optical frequency of the scattered light $R_2$ is $f_0+f_{IF1}+f_{dp2}$, and the optical frequency of the scattered light $R_4$ is $f_0+f_{IF2}+f_{dp2}$.

The transmission-side optical system 7 shapes the light pulses $P_1$ and $P_2$ output from the pulse modulator 5, and outputs the shaped light pulses $P_1$ and $P_2$ to the transmission and reception separating unit 8. The shaping of the light pulse corresponds to shaping of the beam diameter in the light pulse and shaping of the spread angle in the light pulse.

The transmission and reception separating unit 8 is implemented by, for example, a polarization beam splitter and a wavelength plate.

The transmission and reception separating unit 8 is disposed on the optical axes of the shaped light pulses $P_1$ and $P_2$ output from the transmission-side optical system 7.

The transmission and reception separating unit 8 outputs the shaped light pulses $P_1$ and $P_2$ output from the transmission-side optical system 7 to the telescope 9, and outputs the scattered light beams $R_1$, $R_2$, $R_3$, and $R_4$ collected by the telescope 9 to the receiving-side optical system 10.

The telescope 9 is implemented by, for example, a plurality of refraction lenses or a plurality of mirrors.

The telescope 9 radiates the shaped light pulses $P_1$ and $P_2$ output from the transmission and reception separating unit 8 to the space.

The telescope 9 collects the light pulse $P_1$ scattered by the first observation target as scattered light $R_1$, and collects the light pulse $P_1$ scattered by the second observation target as scattered light $R_2$.

The telescope 9 collects the light pulse $P_2$ scattered by the first observation target as scattered light $R_3$, and collects the light pulse $P_2$ scattered by the second observation target as scattered light $R_4$.

The telescope 9 outputs the scattered light beams $R_1$, $R_2$, $R_3$, and $R_4$ to the transmission and reception separating unit 8.

The receiving-side optical system 10 is disposed so that the optical axes of the scattered light beams $R_1$, $R_2$, $R_3$, and $R_4$ output from the transmission and reception separating unit 8 coincide with the optical axis of the optical multiplexing unit 12.

The receiving-side optical system 10 shapes the scattered lights $R_1$, $R_2$, $R_3$, and $R_4$ output from the transmission and reception separating unit 8, and outputs the shaped scattered light beams $R_1$, $R_2$, $R_3$, and $R_4$ to the optical multiplexing unit 12. The shaping of the scattered light corresponds to shaping of the beam diameter in the scattered light and shaping of the spread angle in the scattered light.

The optical detection unit 11 includes an optical multiplexing unit 12, an optical receiving unit 13, and an A/D conversion unit 14.

The optical detection unit 11 detects multiplexed light beams $C_1$, $C_2$, $C_3$, and $C_4$ of the scattered light beams $R_1$, $R_2$, $R_3$, and $R_4$ received by the transmission and reception unit 6 and the reference light that is the laser beam output from the light source 1.

The optical detection unit 11 outputs the detection signals $D_1$, $D_2$, $D_3$, and $D_4$ of the multiplexed light beams $C_1$, $C_2$, $C_3$, and $C_4$ to the signal processing device 15.

The optical multiplexing unit 12 is implemented by, for example, a beam splitter or a fiber type coupler.

The optical multiplexing unit 12 detects the multiplexed light beams $C_1$, $C_2$, $C_3$, and $C_4$ of the shaped scattered light beams $R_1$, $R_2$, $R_3$, and $R_4$ output from the receiving-side optical system 10 and the reference light output from the light division unit 3.

That is, the optical multiplexing unit 12 heterodyne-detects the multiplexed light beams $C_1$, $C_2$, $C_3$, and $C_4$ by mixing the scattered light beams $R_1$, $R_2$, $R_3$, and $R_4$ with the reference light output from the light source 1. The optical frequency of the multiplexed light beam $C_1$ is $f_{IF1}+f_{dp1}$, and the optical frequency of the multiplexed light beam $C_2$ is $f_{IF1}+f_{dp2}$. The optical frequency of the multiplexed light beam $C_3$ is $f_{IF2}+f_{dp1}$, and the optical frequency of the multiplexed light beam $C_4$ is $f_{IF2}+f_{dp2}$.

The optical multiplexing unit 12 outputs the multiplexed light beam $C_1$, $C_2$, $C_3$, and $C_4$ to the optical receiving unit 13.

The optical receiving unit 13 is implemented by, for example, a photodiode.

The optical receiving unit 13 converts the multiplexed light beams $C_1$, $C_2$, $C_3$, and $C_4$ output from the optical multiplexing unit 12 into electric signals.

The optical receiving unit 13 outputs each electric signal to the A/D conversion unit 14.

The optical receiving unit 13 outputs an electric signal having a voltage of substantially 0 to the A/D conversion unit 14 during a period in which none of the scattered light beams $R_1$, $R_2$, $R_3$, and $R_4$ is output from the receiving-side optical system 10.

The A/D conversion unit 14 performs processing of converting the electric signal output from the optical receiving unit 13 from the analog signal into the digital signal $Dig(t)$ during a period in which the pulse signal having the pulse width $\Delta T$ is output from the pulse signal generating unit 4a of the trigger generating unit 4. t is a variable indicating the sampling time.

The A/D conversion unit 14 outputs the digital signal $Dig(t)$ to the signal processing device 15. During the period in which the scattered light $R_1$ is output from the receiving-side optical system 10, the digital signal $Dig(t)$ indicates the detection signal $D_1$ of the multiplexed light beam $C_1$, and during the period in which the scattered light $R_2$ is output from the receiving-side optical system 10, the digital signal $Dig(t)$ indicates the detection signal $D_2$ of the multiplexed light beam $C_2$. During the period in which the scattered light $R_3$ is output from the receiving-side optical system 10, the digital signal $Dig(t)$ indicates the detection signal $D_3$ of the multiplexed light beam $C_3$, and during the period in which the scattered light $R_4$ is output from the receiving-side optical system 10, the digital signal $Dig(t)$ indicates the detection signal $D_4$ of the multiplexed light beam $C_4$.

During a period in which none of the scattered light beams $R_1$, $R_2$, $R_3$, and $R_4$ is output, the digital signal $Dig(t)$ indicates a value of substantially 0.

Figure 3:
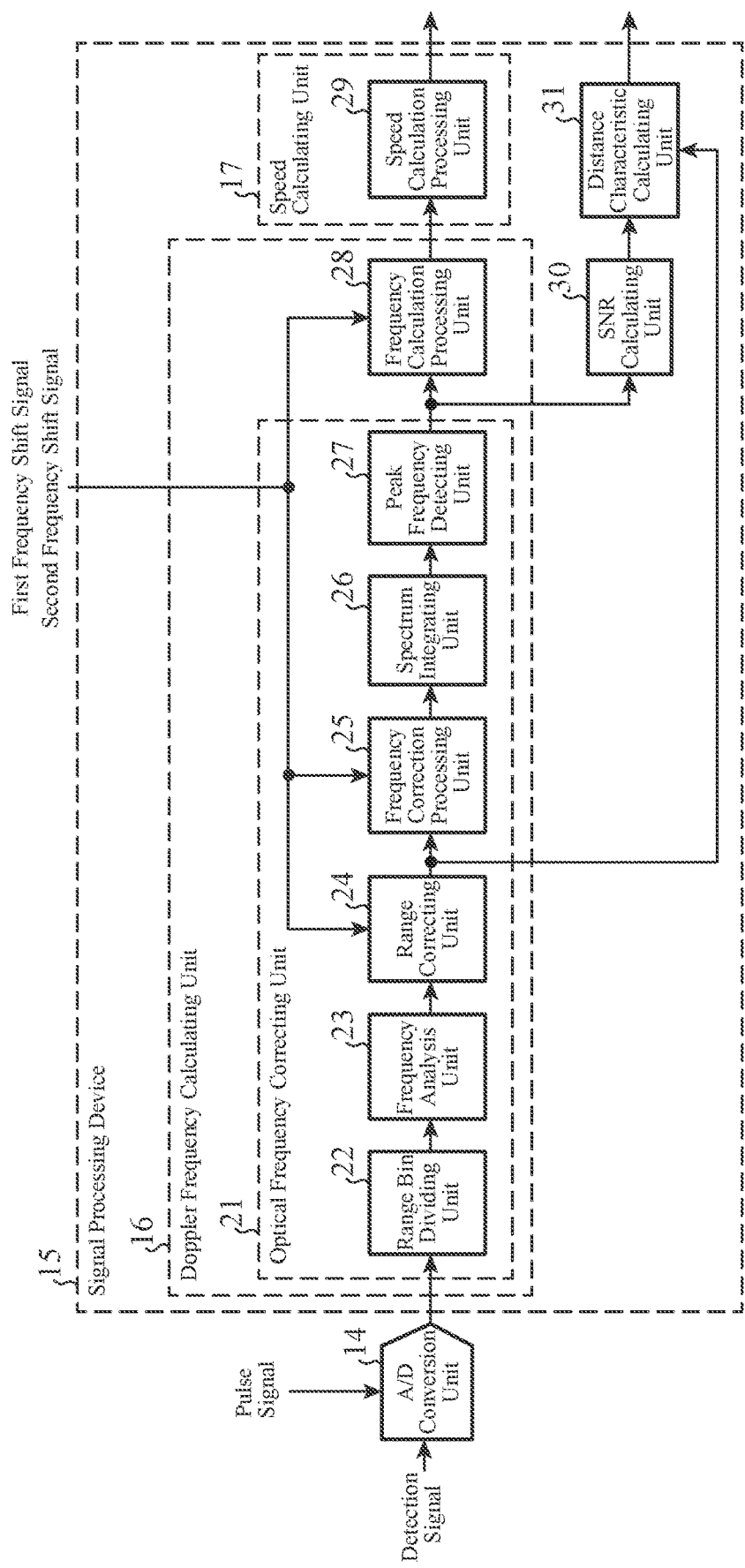
FIG. 3 is a configuration diagram illustrating the signal processing device 15 according to the first embodiment.

FIG. 3 is a configuration diagram illustrating the signal processing device 15 according to the first embodiment.

The signal processing device 15 includes a Doppler frequency calculating unit 16, a speed calculating unit 17, a signal to noise ratio (SNR) calculating unit 30, and a distance characteristic calculating unit 31.

The signal processing device 15 calculates a relative speed $V_1$ of the first observation target with respect to the lidar device and a relative speed $V_2$ of the second observation target with respect to the lidar device as the moving speeds of the first observation target and the second observation target on the basis of the digital signal $Dig(t)$ output from the A/D conversion unit 14.

Figure 4:
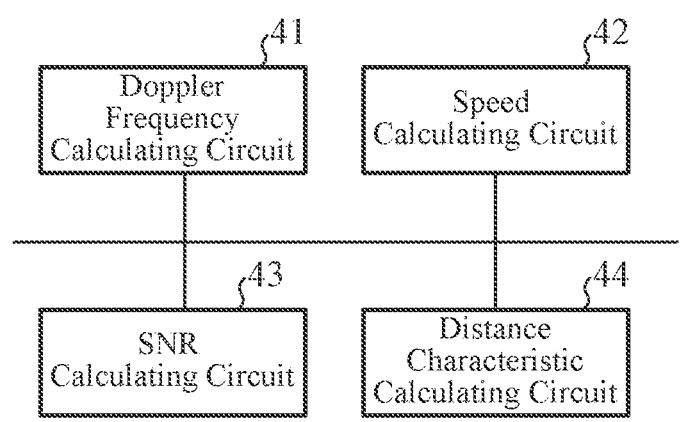
FIG. 4 is a hardware configuration diagram illustrating hardware of the signal processing device 15 according to the first embodiment.

FIG. 4 is a hardware configuration diagram illustrating hardware of the signal processing device 15 according to the first embodiment.

The Doppler frequency calculating unit 16 is implemented by, for example, a Doppler frequency calculating circuit 41 illustrated in FIG. 4.

The Doppler frequency calculating unit 16 includes an optical frequency correcting unit 21 and a frequency calculation processing unit 28.

The Doppler frequency calculating unit 16 acquires the optical frequencies $f_0+f_{IF1}$ and $f_0+f_{IF2}$ of the respective light pulses $P_1$ and $P_2$ generated by the pulse modulating unit 2 and the detection signals $D_1$, $D_2$, $D_3$, and $D_4$ of the respective multiplexed light beams $C_1$, $C_2$, $C_3$, and $C_4$ output from the optical detection unit 11.

The Doppler frequency calculating unit 16 calculates the Doppler frequency included in the optical frequency of each of the scattered light beams $R_1$, $R_2$, $R_3$, and $R_4$ and due to the movement of each observation target from the optical frequencies $f_0+f_{IF1}$ and $f_0+f_{IF2}$ of the respective light pulses $P_1$ and $P_2$ and the respective detection signals $D_1$, $D_2$, $D_3$, and $D_4$.

That is, the Doppler frequency calculating unit 16 calculates the frequency difference $\Delta f$ ($=f_{IF2}-f_{IF1}$) between the optical frequency $f_0+f_{IF1}$ of one light pulse $P_1$ and the optical frequency $f_0+f_{IF2}$ of the remaining light pulse $P_2$ among the plurality of light pulses $P_1$ and $P_2$.

The Doppler frequency calculating unit 16 calculates the Doppler frequency $f_{dp1}$ included in the optical frequencies of the scattered light beams $R_1$ and $R_3$ as the Doppler frequency $f_{dp1}$ corresponding to the relative speed $V_1$ of the first observation target from the frequency difference $\Delta f$ and the detection signals $D_1$ and $D_3$ included in the digital signal Dig(t).

The Doppler frequency calculating unit 16 calculates the Doppler frequency $f_{dp2}$ included in the optical frequencies of the scattered light beams $R_2$ and $R_4$ as the Doppler frequency $f_{dp2}$ corresponding to the relative speed $V_2$ of the second observation target from the frequency difference $\Delta f$ and the detection signals $D_2$ and $D_4$ included in the digital signal Dig(t).

The Doppler frequency calculating unit 16 outputs the Doppler frequency $f_{dp1}$ and the Doppler frequency $f_{dp2}$ to the frequency calculation processing unit 28.

The optical frequency correcting unit 21 includes a range bin dividing unit 22, a frequency analysis unit 23, a range correcting unit 24, a frequency correction processing unit 25, a spectrum integrating unit 26, and a peak frequency detecting unit 27.

The optical frequency correcting unit 21 acquires each of the first frequency shift signal and the second frequency shift signal from the trigger generating unit 4.

The optical frequency correcting unit 21 calculates the frequency difference $\Delta f$ by subtracting the modulation frequency $f_{IF1}$ indicated by the first frequency shift signal from the modulation frequency $f_{IF2}$ indicated by the second frequency shift signal.

The optical frequency correcting unit 21 acquires the digital signal Dig(t) including the detection signals $D_1$, $D_2$, $D_3$, and $D_4$ from the A/D conversion unit 14.

The optical frequency correcting unit 21 corrects the optical frequency $f_{IF2}+f_{dp1}$ of the multiplexed light $C_3$ on the basis of the frequency difference $\Delta f$.

The optical frequency correcting unit 21 corrects the optical frequency $f_{IF2}+f_{dp2}$ of the multiplexed light $C_4$ on the basis of the frequency difference $\Delta f$.

The range bin dividing unit 22 divides the digital signal Dig(t) output from the A/D conversion unit 14 in the time direction. The division width $\Delta t$ in the time direction of the digital signal Dig(t) corresponds to the range bin width Rbw.

Accordingly, the divided digital signal Dig(1) related to sampling time t=1 corresponds to a range bin (1), and the divided digital signal Dig(2) related to sampling time t=2 corresponds to a range bin (2). In addition, the divided digital signal Dig(3) related to sampling time t=3 corresponds to a range bin (3).

The range bin dividing unit 22 outputs each of the divided digital signals Dig(t) to the frequency analysis unit 23 as a range bin signal (n). n is a variable indicating a range bin, and n=1, 2, 3, . . . .

The frequency analysis unit 23 calculates a frequency spectrum FS(n) of each range bin signal (n) by performing fast Fourier transform (FFT) processing on each range bin signal (n) output from the range bin dividing unit 22.

The frequency analysis unit 23 outputs each frequency spectrum FS(n) to the range correcting unit 24.

The range correcting unit 24 acquires each frequency spectrum FS(n) from the frequency analysis unit 23.

The range correcting unit 24 acquires the first frequency shift signal and the second frequency shift signal from the trigger generating unit 4.

The range correcting unit 24 detects each of a peak spectrum $S_{p1}$, a peak spectrum $S_{p2}$, a peak spectrum $S_{p3}$, and a peak spectrum $S_{p4}$ from the frequency spectrum FS(n).

Further, the range correcting unit 24 detects the peak frequency $f_{p1}$ corresponding to the peak spectrum $S_{p1}$ and detects the peak frequency $f_{p2}$ corresponding to the peak spectrum $S_{p2}$.

The range correcting unit 24 detects the peak frequency $f_{p3}$ corresponding to the peak spectrum $S_{p3}$ and detects the peak frequency $f_{p4}$ corresponding to the peak spectrum $S_{p4}$.

The range correcting unit 24 calculates an absolute value $|\Delta f_{1-1}|$ of a difference between the peak frequency $f_{p1}$ and the modulation frequency $f_{IF1}$ indicated by the first frequency shift signal and an absolute value $|\Delta f_{1-2}|$ of a difference between the peak frequency $f_{p1}$ and the modulation frequency $f_{IF2}$ indicated by the second frequency shift signal.

If the absolute value $|\Delta f_{1-1}|$ of the difference is equal to or less than the absolute value $|\Delta f_{1-2}|$ of the difference, the range correcting unit 24 determines that the multiplexed light having the peak spectrum $S_{p1}$ is the multiplexed light $C_1$ corresponding to the light pulse $P_1$ or the multiplexed light $C_2$ corresponding to the light pulse $P_1$.

If the absolute value $|\Delta f_{1-1}|$ of the difference is larger than the absolute value $|\Delta f_{1-2}|$ of the difference, the range correcting unit 24 determines that the multiplexed light having the peak spectrum $S_{p1}$ is the multiplexed light $C_3$ corresponding to the light pulse $P_2$ or the multiplexed light $C_4$ corresponding to the light pulse $P_2$.

The range correcting unit 24 calculates an absolute value $|\Delta f_{2-1}|$ of a difference between the peak frequency $f_{p2}$ and the modulation frequency $f_{IF1}$ and an absolute value $|\Delta f_{2-2}|$ of a difference between the peak frequency $f_{p2}$ and the modulation frequency $f_{IF2}$.

If the absolute value $|\Delta f_{2-1}|$ of the difference is equal to or less than the absolute value $|\Delta f_{2-2}|$ of the difference, the range correcting unit 24 determines that the multiplexed light having the peak spectrum $S_{p2}$ is the multiplexed light $C_1$ corresponding to the light pulse $P_1$ or the multiplexed light $C_2$ corresponding to the light pulse $P_1$.

If the absolute value $|\Delta f_{2-1}|$ of the difference is larger than the absolute value $|\Delta f_{2-2}|$ of the difference, the range correcting unit 24 determines that the multiplexed light having the peak spectrum $S_{p2}$ is the multiplexed light $C_3$ corresponding to the light pulse $P_2$ or the multiplexed light $C_4$ corresponding to the light pulse $P_2$.

The range correcting unit 24 calculates an absolute value $|\Delta f_{3-1}|$ of a difference between the peak frequency $f_{p3}$ and the modulation frequency $f_{IF1}$ and an absolute value $|\Delta f_{3-2}|$ of a difference between the peak frequency $f_{p3}$ and the modulation frequency $f_{IF2}$.

If the absolute value $|\Delta f_{3-1}|$ of the difference is equal to or less than the absolute value $|\Delta f_{3-2}|$ of the difference, the range correcting unit 24 determines that the multiplexed light having the peak spectrum $S_{p3}$ is the multiplexed light $C_1$ corresponding to the light pulse $P_1$ or the multiplexed light $C_2$ corresponding to the light pulse $P_1$.

If the absolute value $|\Delta f_{3-1}|$ of the difference is larger than the absolute value $|\Delta f_{3-2}|$ of the difference, the range correcting unit 24 determines that the multiplexed light having the peak spectrum $S_{p3}$ is the multiplexed light $C_3$ corresponding to the light pulse $P_2$ or the multiplexed light $C_4$ corresponding to the light pulse $P_2$.

The range correcting unit 24 calculates an absolute value $|\Delta f_{4-1}|$ of a difference between the peak frequency $f_{p4}$ and the modulation frequency $f_{IF1}$ and an absolute value $|\Delta f_{4-2}|$ of a difference between the peak frequency $f_{p4}$ and the modulation frequency $f_{IF2}$.

If the absolute value $|\Delta f_{4-1}|$ of the difference is equal to or less than the absolute value $|\Delta f_{4-2}|$ of the difference, the range correcting unit 24 determines that the multiplexed light having the peak spectrum $S_{p4}$ is the multiplexed light $C_1$ corresponding to the light pulse $P_1$ or the multiplexed light $C_2$ corresponding to the light pulse $P_1$.

If the absolute value $|\Delta f_{4-1}|$ of the difference is larger than the absolute value $|\Delta f_{4-2}|$ of the difference, the range correcting unit 24 determines that the multiplexed light having the peak spectrum $S_{p4}$ is the multiplexed light $C_3$ corresponding to the light pulse $P_2$ or the multiplexed light $C_4$ corresponding to the light pulse $P_2$.

Here, for convenience of description, it is assumed that each of the multiplexed light having the peak spectrum $S_{p1}$ and the multiplexed light having the peak spectrum $S_{p2}$ is the multiplexed light $C_1$ corresponding to the light pulse $P_1$ or the multiplexed light $C_2$ corresponding to the light pulse $P_1$.

In addition, it is assumed that each of the multiplexed light having the peak spectrum $S_{p3}$ and the multiplexed light having the peak spectrum $S_{p4}$ is the multiplexed light $C_3$ corresponding to the light pulse $P_2$ or the multiplexed light $C_4$ corresponding to the light pulse $P_2$.

In this case, if the range bin of the peak spectrum $S_{p1}$ is equal to or less than the range bin of the peak spectrum $S_{p2}$, the range correcting unit 24 determines that the multiplexed light having the peak spectrum $S_{p1}$ is the multiplexed light $C_1$ corresponding to the light pulse $P_1$ and the multiplexed light having the peak spectrum $S_{p2}$ is the multiplexed light $C_2$ corresponding to the light pulse $P_1$. If the range bin of the peak spectrum $S_{p1}$ is larger than the range bin of the peak spectrum $S_{p2}$, the range correcting unit 24 determines that the multiplexed light having the peak spectrum $S_{p1}$ is the multiplexed light $C_2$ corresponding to the light pulse $P_1$ and the multiplexed light having the peak spectrum $S_{p2}$ is the multiplexed light $C_1$ corresponding to the light pulse $P_1$.

In addition, if the range bin of the peak spectrum $S_{p3}$ is equal to or less than the range bin of the peak spectrum $S_{p4}$, the range correcting unit 24 determines that the multiplexed light having the peak spectrum $S_{p3}$ is the multiplexed light $C_3$ corresponding to the light pulse $P_2$ and the multiplexed light having the peak spectrum $S_{p4}$ is the multiplexed light $C_4$ corresponding to the light pulse $P_2$. If the range bin of the peak spectrum $S_{p3}$ is larger than the range bin of the peak spectrum $S_{p4}$, the range correcting unit 24 determines that the multiplexed light having the peak spectrum $S_{p3}$ is the multiplexed light $C_4$ corresponding to the light pulse $P_2$ and the multiplexed light having the peak spectrum $S_{p4}$ is the multiplexed light $C_3$ corresponding to the light pulse $P_2$.

Here, for convenience of description, it is assumed that the multiplexed light having the peak spectrum $S_{p1}$ is the multiplexed light $C_1$ and the multiplexed light having the peak spectrum $S_{p2}$ is the multiplexed light $C_2$. In addition, it is assumed that the multiplexed light having the peak spectrum $S_{p3}$ is the multiplexed light $C_3$ and the multiplexed light having the peak spectrum $S_{p4}$ is the multiplexed light $C_4$.

Figure 11:
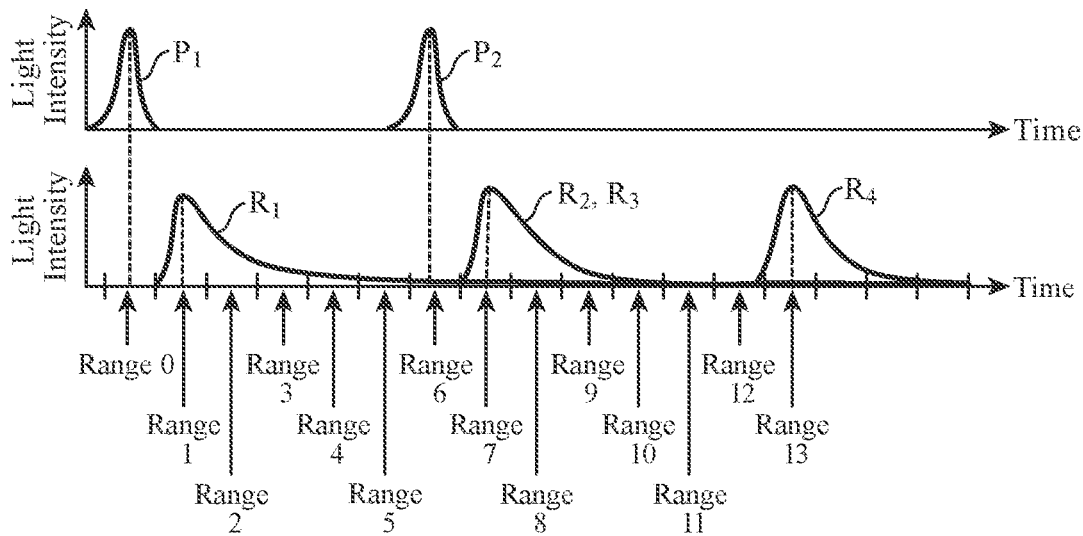
FIG. 11 is an explanatory diagram illustrating a range bin in which the scattered light $R_1$ related to multiplexed light $C_1$ is present, a range bin in which the scattered light $R_2$ and $R_3$ related to multiplexed light $C_2$ and $C_3$ are present, and a range bin in which the scattered light $R_4$ related to multiplexed light $C_4$ is present.

When determining that the multiplexed light beams $C_1$ and $C_2$ are the multiplexed light beams corresponding to the light pulse $P_1$ and the multiplexed light beams $C_3$ and $C_4$ are the multiplexed light beams corresponding to the light pulse $P_2$, the range correcting unit 24 corrects the range bin (7) in which the scattered light $R_3$ related to the multiplexed light $C_3$ is present and the range bin (13) in which the scattered light $R_4$ related to the multiplexed light $C_4$ is present as illustrated in FIG. 11 to be described later.

That is, the range correcting unit 24 corrects the range bin (7) in which the scattered light $R_3$ related to the multiplexed light $C_3$ is present to the range bin (1) by subtracting the period Trep (=6) from the range bin (7) in which the scattered light $R_3$ related to the multiplexed light $C_3$ is present.

In addition, the range correcting unit 24 corrects the range bin (13) in which the scattered light $R_4$ related to the multiplexed light $C_4$ is present to the range bin (7) by subtracting the period Trep (=6) from the range bin (13) in which the scattered light $R_4$ related to the multiplexed light $C_4$ is present.

In the example of FIG. 11, the time difference between the radiation time $T_1$ of the light pulse $P_1$ and the radiation time $T_2$ of the light pulse $P_2$ corresponds to the range bin (6), and the period Trep is 6. Therefore, n' that is the corrected range bin in which the scattered light $R_3$ related to the multiplexed light $C_3$ is present is 1 (=7—6), and n' that is the corrected range bin in which the scattered light $R_4$ related to the multiplexed light $C_4$ is present is 7 (=13−6).

The range correcting unit 24 outputs the frequency spectrum FS(n) for the range bin (n) in which the scattered light beams $R_1$ and $R_2$ related to the multiplexed light beams $C_1$ and $C_2$ are present among the plurality of frequency spectra FS(1) to FS(N) to the frequency correction processing unit 25.

In addition, the range correcting unit 24 outputs the frequency spectrum FS(n') for the corrected range bin (n') in which the scattered light beams $R_3$ and $R_4$ related to the multiplexed light beams $C_3$ and $C_4$ are present among the plurality of frequency spectra FS(1) to FS(N) to the frequency correction processing unit 25.

The range correcting unit 24 outputs the optical frequency $f_{IF1}+f_{dp1}$ ($=f_{p1}$) of the multiplexed light $C_1$, the optical frequency $f_{IF1}+f_{dp2}$ ($=f_{p2}$) of the multiplexed light $C_2$, the optical frequency $f_{IF2}+f_{dp1}$ ($=f_{p3}$) of the multiplexed light $C_3$, and the optical frequency $f_{IF2}+f_{dp2}$ ($=f_{p4}$) of the multiplexed light $C_4$ to the frequency correction processing unit 25.

The range correcting unit 24 outputs the range bin in which the scattered light $R_1$ related to the multiplexed light $C_1$ is present and the range bin in which the scattered light $R_2$ related to the multiplexed light $C_2$ is present to the distance characteristic calculating unit 31.

The frequency correction processing unit 25 acquires the first frequency shift signal and the second frequency shift signal from the trigger generating unit 4.

The frequency correction processing unit 25 calculates a frequency difference $\Delta f\ (=f_{IF2}-f_{IF1})$ between the modulation frequency $f_{IF1}$ indicated by the first frequency shift signal and the modulation frequency $f_{IF2}$ indicated by the second frequency shift signal.

The frequency correction processing unit 25 acquires, from the range correcting unit 24, the frequency spectrum FS(n) for the range bin (n) in which the scattered light beams $R_1$ and $R_2$ related to the multiplexed light beams $C_1$ and $C_2$ are present and the frequency spectrum FS(n') for the corrected range bin (n') in which the scattered light beams $R_3$ and $R_4$ related to the multiplexed light beams $C_3$ and $C_4$ are present.

The frequency correction processing unit 25 acquires, from the range correcting unit 24, the optical frequency $f_{IF1}+f_{dp1}$ of the multiplexed light $C_1$, the optical frequency $f_{IF1}+f_{dp2}$ of the multiplexed light $C_2$, the optical frequency $f_{IF2}+f_{dp1}$ of the multiplexed light $C_3$, and the optical frequency $f_{IF2}+f_{dp2}$ of the multiplexed light $C_4$ after range bin correction.

The frequency correction processing unit 25 corrects the optical frequency of the multiplexed light $C_3$ by subtracting the frequency difference $\Delta f$ from the optical frequency $f_{IF2}+f_{dp1}$ of the multiplexed light $C_3$ after the range bin correction. The corrected optical frequency of the multiplexed light $C_3$ is $f_{IF1}+f_{dp1}$, which is the same frequency as the optical frequency $f_{IF1}+f_{dp1}$ of the multiplexed light $C_1$.

The frequency correction processing unit 25 corrects the optical frequency of the multiplexed light $C_4$ by subtracting the frequency difference $\Delta f$ from the optical frequency $f_{IF2}+f_{dp2}$ of the multiplexed light $C_4$ after the range bin correction. The corrected optical frequency of the multiplexed light $C_4$ is $f_{IF1}+f_{dp2}$, which is the same frequency as the optical frequency $f_{IF1}+f_{dp2}$ of the multiplexed light $C_2$.

In the signal processing device 15 illustrated in FIG. 3, the frequency correction processing unit 25 corrects the optical frequencies of the multiplexed light beams $C_3$ and $C_4$ after the range bin correction to be the same as the optical frequency of the multiplexed light beams $C_1$ and $C_2$ in which the range bins are not corrected. However, this is merely an example, and the optical frequencies of the multiplexed light beams $C_1$ and $C_2$ in which the range bins are not corrected may be corrected to be the same as the optical frequencies of the multiplexed light beams $C_3$ and $C_4$ after the range bin correction.

The frequency correction processing unit 25 outputs the frequency spectrum FS(n=1) for the range bin (n=1) in which the scattered light $R_1$ related to the multiplexed light $C_1$ is present to the spectrum integrating unit 26.

The frequency correction processing unit 25 outputs the frequency spectrum FS(n=7) for the range bin (n=7) in which the scattered light $R_2$ related to the multiplexed light $C_2$ is present to the spectrum integrating unit 26.

The frequency correction processing unit 25 changes the optical frequency of the frequency spectrum FS(n'=1) for the corrected range bin (n'=1) in which the scattered light $R_3$ related to the multiplexed light $C_3$ is present to the corrected optical frequency $f_{IF1}+f_{dp1}$ of the multiplexed light $C_3$.

The frequency correction processing unit 25 outputs the frequency spectrum FS(n'=1) after the optical frequency change to the spectrum integrating unit 26.

The frequency correction processing unit 25 changes the optical frequency of the frequency spectrum FS(n'=7) for the corrected range bin (n'=7) in which the scattered light $R_4$ related to the multiplexed light $C_4$ is present to the corrected optical frequency $f_{IF1}+f_{dp2}$ of the multiplexed light $C_4$.

The frequency correction processing unit 25 outputs the frequency spectrum FS(n'=7) after the optical frequency change to the spectrum integrating unit 26.

The spectrum integrating unit 26 acquires, from the frequency correction processing unit 25, the frequency spectrum FS(n=1), the frequency spectrum FS(n=7), the frequency spectrum FS(n'=1) after the optical frequency change, and the frequency spectrum FS(n'=7) after the optical frequency change.

The spectrum integrating unit 26 integrates the frequency spectrum FS(n=1), the frequency spectrum FS(n=7), the frequency spectrum FS(n'=1) after the optical frequency change, and the frequency spectrum FS(n'=7) after the optical frequency change. By being integrated by the spectrum integrating unit 26, the spectrum intensity of the frequency spectrum corresponding to the optical frequency $f_{IF1}+f_{dp1}$ and the spectrum intensity of the frequency spectrum corresponding to the optical frequency $f_{IF1}+f_{dp2}$ are increased.

The spectrum integrating unit 26 outputs the integrated frequency spectrum $\Sigma$HFS to the peak frequency detecting unit 27.

The peak frequency detecting unit 27 acquires the integrated frequency spectrum $\Sigma$HFS from the spectrum integrating unit 26.

The peak frequency detecting unit 27 specifies spectral intensities $FS_{max1}$ and $FS_{max2}$ equal to or greater than a threshold value among a plurality of spectral intensities included in the integrated frequency spectrum $\Sigma$HFS. Since the first observation target and the second observation target are present in space, two spectral intensities $FS_{max1}$ and $FS_{max2}$ are specified. The threshold value may be stored in the internal memory of the peak frequency detecting unit 27 or may be given from the outside of the lidar device illustrated in FIG. 1.

The peak frequency detecting unit 27 outputs the peak frequencies $f_{peak1}$ and $f_{peak2}$ corresponding to the respective spectral intensities $FS_{max1}$ and $FS_{max2}$ to the frequency calculation processing unit 28, and outputs the integrated frequency spectrum $\Sigma$HFS to the SNR calculating unit 30.

The frequency calculation processing unit 28 acquires the peak frequencies $f_{peak1}$ and $f_{peak2}$ from the peak frequency detecting unit 27.

The frequency calculation processing unit 28 acquires the first frequency shift signal and the second frequency shift signal from the trigger generating unit 4.

The frequency calculation processing unit 28 calculates the Doppler frequency $f_{dp1}$ included in the optical frequency $f_{IF1}+f_{dp1}$ of the multiplexed light $C_1$ by subtracting the modulation frequency $f_{IF1}$ indicated by the first frequency shift signal from the peak frequency $f_{peak1}$.

The frequency calculation processing unit 28 calculates the Doppler frequency $f_{dp2}$ included in the optical frequency $f_{IF2}+f_{dp2}$ of the multiplexed light $C_2$ by subtracting the modulation frequency $f_{IF2}$ indicated by the second frequency shift signal from the peak frequency $f_{peak2}$.

The frequency calculation processing unit 28 outputs the Doppler frequencies $f_{dp1}$ and $f_{dp2}$ to a speed calculation processing unit 29.

The speed calculating unit 17 is implemented by, for example, a speed calculating circuit 42 illustrated in FIG. 4.

The speed calculating unit 17 includes the speed calculation processing unit 29.

The speed calculation processing unit 29 acquires the Doppler frequencies $f_{dp1}$ and $f_{dp2}$ from the frequency calculation processing unit 28.

The speed calculation processing unit 29 calculates the relative speed $V_1$ of the first observation target from the Doppler frequency $f_{dp1}$.

The speed calculation processing unit 29 calculates the relative speed $V_2$ of the second observation target from the Doppler frequency $f_{dp2}$.

The SNR calculating unit 30 is implemented by, for example, an SNR calculating circuit 43 illustrated in FIG. 4.

The SNR calculating unit 30 acquires the integrated frequency spectrum ΣHFS from the peak frequency detecting unit 27.

The SNR calculating unit 30 calculates a signal of each range bin (n) by performing inverse FFT processing on the integrated frequency spectrum ΣHFS.

The SNR calculating unit 30 calculates the SNR of each range bin (n) by dividing the signal of each range bin (n) by the out-of-band noise.

The SNR calculating unit 30 outputs the SNR of each range bin (n) to the distance characteristic calculating unit 31.

The distance characteristic calculating unit 31 is implemented by, for example, a distance characteristic calculating circuit 44 illustrated in FIG. 4.

The distance characteristic calculating unit 31 acquires, from the range correcting unit 24, a range bin (n=1) in which the scattered light $R_1$ related to the multiplexed light $C_1$ is present and a range bin (n=7) in which the scattered light $R_2$ related to the multiplexed light $C_2$ is present.

The distance characteristic calculating unit 31 calculates a distance $L_1$ from the lidar device to the first observation target from the range bin (n=1) in which the scattered light $R_1$ related to the multiplexed light $C_1$ is present, the A/D conversion rate Rate of the A/D conversion unit 14, and the range bin width Rbw.

The distance characteristic calculating unit 31 calculates a distance $L_2$ from the lidar device to the second observation target from the range bin (n=7) in which the scattered light $R_2$ related to the multiplexed light $C_2$ is present, the A/D conversion rate Rate of the A/D conversion unit 14, and the range bin width Rbw.

The distance characteristic calculating unit 31 causes, for example, a display device (not illustrated) to display a distance characteristic (a-scope) indicating a correspondence relationship between the distance of the range bin (n) and the SNR calculated by the SNR calculating unit 30.

In FIG. 1, it is assumed that each of the Doppler frequency calculating unit 16, the speed calculating unit 17, the SNR calculating unit 30, and the distance characteristic calculating unit 31, which are components of the signal processing device 15, is implemented by dedicated hardware as illustrated in FIG. 4. That is, it is assumed that the signal processing device 15 is implemented by the Doppler frequency calculating circuit 41, the speed calculating circuit 42, the SNR calculating circuit 43, and the distance characteristic calculating circuit 44.

Each of the Doppler frequency calculating circuit 41, the speed calculating circuit 42, the SNR calculating circuit 43, and the distance characteristic calculating circuit 44 corresponds to, for example, a single circuit, a composite circuit, a programmed processor, a parallel-programmed processor, an application specific integrated circuit (ASIC), an FPGA, or a combination thereof.

The components of the signal processing device 15 are not limited to those implemented by dedicated hardware, and the signal processing device 15 may be implemented by software, firmware, or a combination of software and firmware.

The software or firmware is stored in a memory of a computer as a program. The computer means hardware that executes a program, and corresponds to, for example, a central processing unit (CPU), a central processing unit, a processing unit, an arithmetic unit, a microprocessor, a microcomputer, a processor, or a digital signal processor (DSP).

Figure 5:
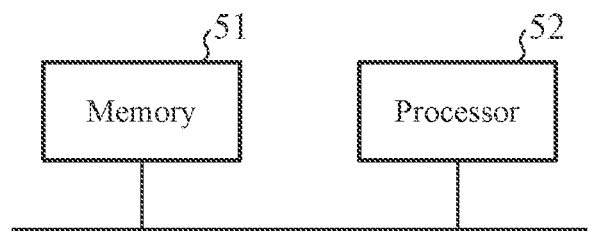

FIG. 5 is a hardware configuration diagram of a computer in a case where the signal processing device 15 is implemented by software, firmware, or the like.

In a case where the signal processing device 15 is implemented by software, firmware, or the like, a program for causing a computer to execute each processing procedures in the Doppler frequency calculating unit 16, the speed calculating unit 17, the SNR calculating unit 30, and the distance characteristic calculating unit 31 is stored in a memory 51. Then, a processor 52 of the computer executes the program stored in the memory 51.

Furthermore, FIG. 4 illustrates an example in which each of the components of the signal processing device 15 is implemented by dedicated hardware, and FIG. 5 illustrates an example in which the signal processing device 15 is implemented by software, firmware, or the like. However, this is merely an example, and some components in the signal processing device 15 may be implemented by dedicated hardware, and the remaining components may be implemented by software, firmware, or the like.

Next, the operation of the lidar device illustrated in FIG. 1 will be described.

Figure 6:
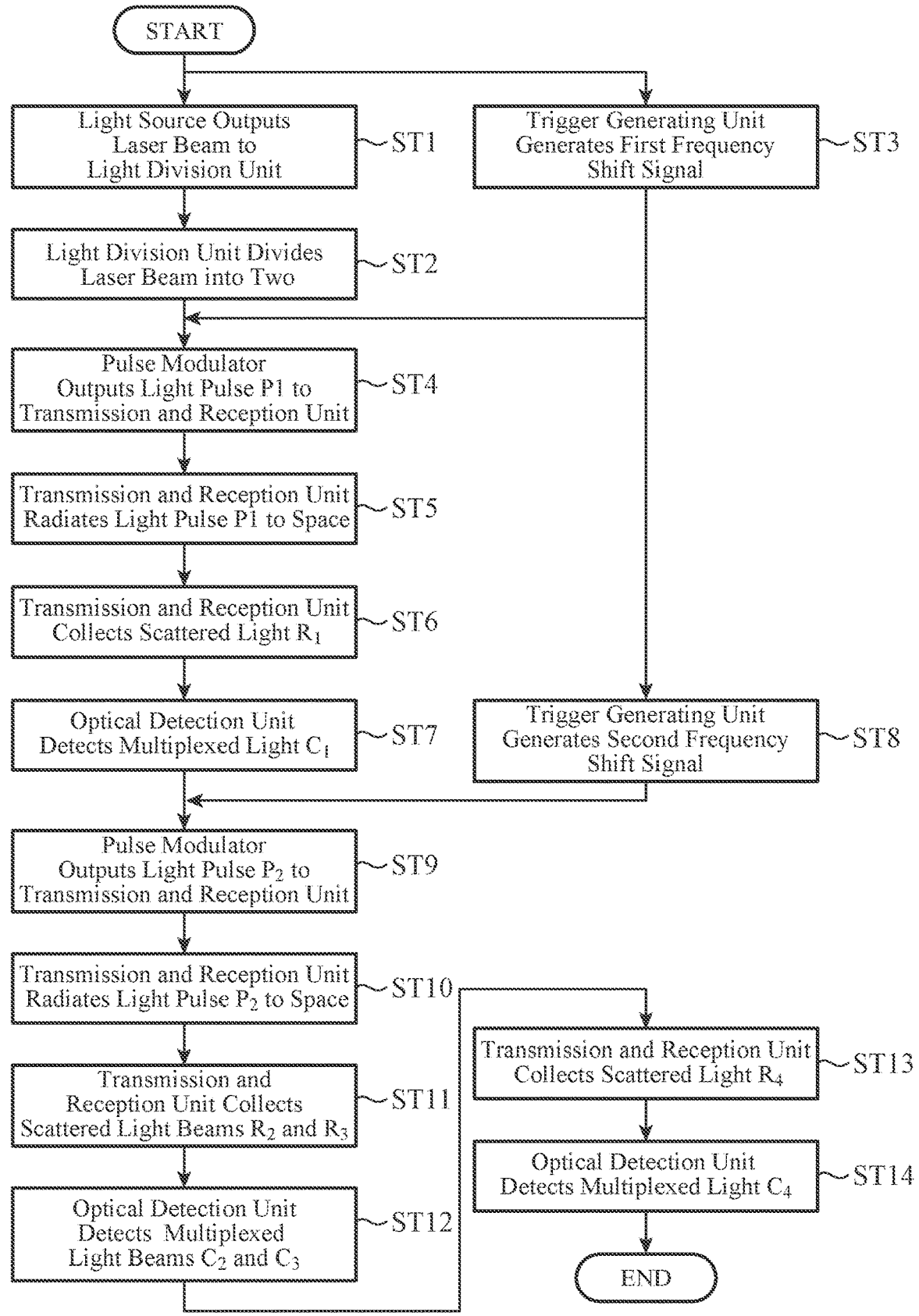
FIG. 6 is a flowchart illustrating a processing procedure of the lidar device illustrated in FIG. 1.

FIG. 6 is a flowchart illustrating a processing procedure of the lidar device illustrated in FIG. 1.

Figure 7:
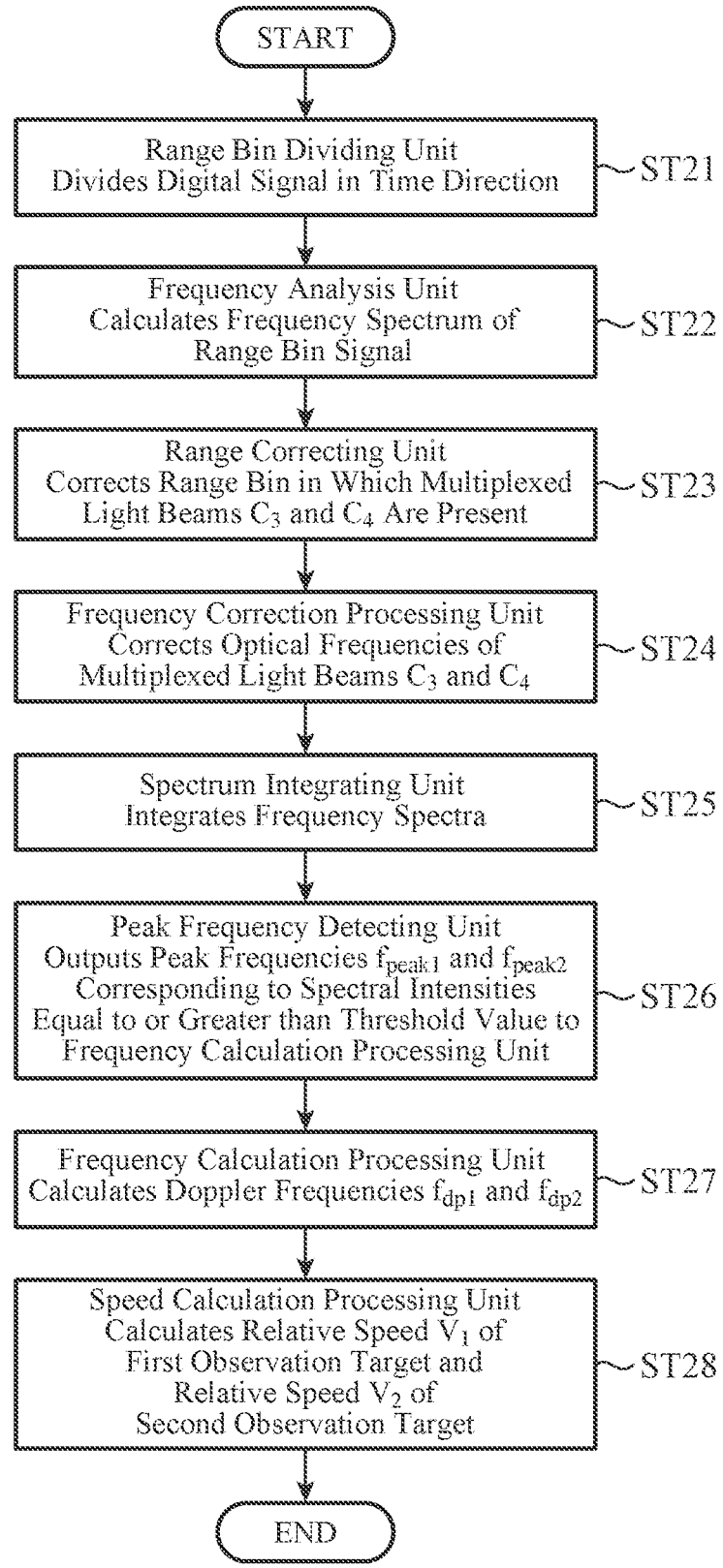
FIG. 7 is a flowchart illustrating a signal processing method which is a processing procedure of the signal processing device 15.

FIG. 7 is a flowchart illustrating a signal processing method which is a processing procedure of the signal processing device 15.

The light source 1 outputs a laser beam, which is continuous light having an optical frequency $f_0$, to the light division unit 3 of the pulse modulating unit 2 (step ST1 in FIG. 6).

Upon receiving the laser beam from the light source 1, the light division unit 3 divides the laser beam into two (step ST2 in FIG. 6).

The light division unit 3 outputs one of the divided laser beams to the pulse modulator 5, and outputs the other of the divided laser beams to the optical multiplexing unit 12 as reference light.

The pulse signal generating unit 4a of the trigger generating unit 4 generates a pulse signal having a pulse width ΔT.

The pulse signal generating unit 4a repeatedly outputs the pulse signal to each of the pulse modulator 5, the A/D conversion unit 14, and the signal processing device 15 at a period Trep.

The reference signal generating unit 4b of the trigger generating unit 4 generates a reference signal that is an electric signal of the frequency f.

The reference signal generating unit 4b outputs the reference signal to the first shift signal generating unit 4c.

Upon receiving the reference signal from the reference signal generating unit 4b, the first shift signal generating unit 4c generates a first frequency shift signal indicating the modulation frequency $f_{IF1}$ from the reference signal (step ST3 in FIG. 6).

The first shift signal generating unit 4c outputs the first frequency shift signal to the switch 4e.

Upon receiving the first frequency shift signal from the first shift signal generating unit 4c, the switch 4e outputs the first frequency shift signal to each of the pulse modulator 5 and the signal processing device 15.

Each time the pulse modulator 5 receives a pulse signal having a pulse width ΔT from the pulse signal generating unit 4a, the pulse modulator 5 pulse-modulates the laser beam output from the light division unit 3 according to the pulse signal.

That is, the pulse modulator 5 converts the laser beam output from the light division unit 3 into the light pulse P having the pulse width ΔT.

When the first frequency shift signal is output from the switch 4e, the pulse modulator 5 shifts the optical frequency $f_0$ of the light pulse P to the optical frequency $f_0+f_{IF1}$ to generate the light pulse $P_1$ having the optical frequency $f_0+f_{IF1}$.

The pulse modulator 5 outputs the light pulse $P_1$ to the transmission-side optical system 7 (step ST4 in FIG. 6).

Upon receiving the light pulse $P_1$ from the pulse modulator 5, the transmission-side optical system 7 shapes the light pulse $P_1$ and outputs the shaped light pulse $P_1$ to the transmission and reception separating unit 8.

Upon receiving the shaped light pulse $P_1$ from the transmission-side optical system 7, the transmission and reception separating unit 8 outputs the shaped light pulse $P_1$ to the telescope 9.

The telescope 9 radiates the shaped light pulse $P_1$ output from the transmission and reception separating unit 8 to the space (step ST5 in FIG. 6).

Figure 8:
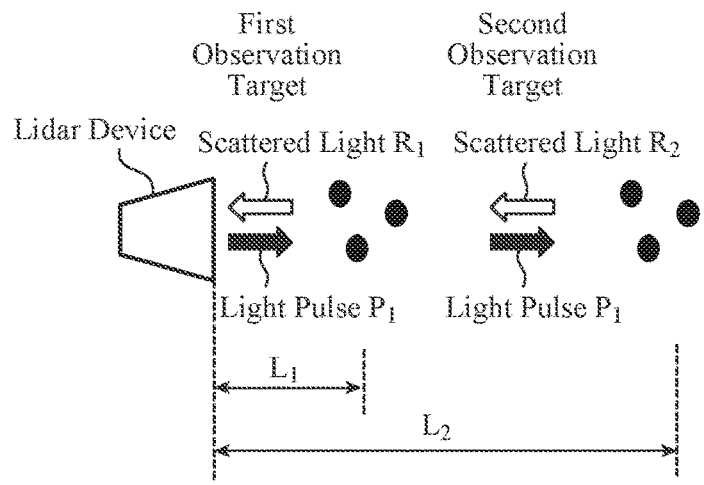
FIG. 8 is an explanatory diagram illustrating light pulse $P_1$ radiated from the lidar device, scattered light $R_1$ from a first observation object, and scattered light $R_2$ from a second observation object.

When the first observation target and the second observation target are present in the space in the irradiation region of the light pulse $P_1$, the light pulse $P_1$ is scattered by each of the first observation target and the second observation target as illustrated in FIG. 8.

FIG. 8 is an explanatory diagram illustrating the light pulse $P_1$ radiated from the lidar device, the scattered light $R_1$ from the first observation object, and the scattered light $R_2$ from the second observation object.

In the example of FIG. 8, the distance $L_1$ from the lidar device to the first observation target is shorter than the distance $L_2$ from the lidar device to the second observation target. Therefore, the scattered light $R_1$ from the first observation target returns to the lidar device earlier than the scattered light $R_2$ from the second observation target.

Figure 9:
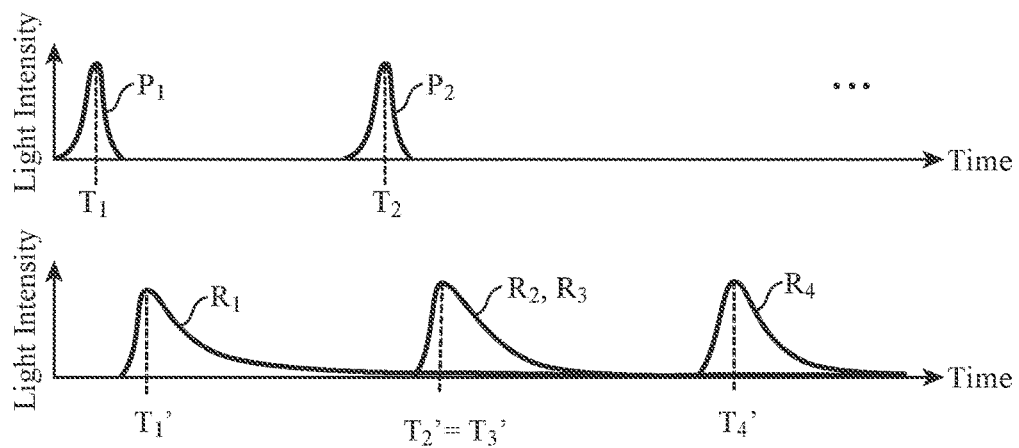
FIG. 9 is an explanatory diagram illustrating radiation times $T_1$ and $T_2$ of light pulses $P_1$ and $P_2$ radiated from the lidar device, reception times $T_1'$ and $T_3'$ of scattered light $R_1$ and $R_3$ from the first observation target, and reception times $T_2'$ and $T_4'$ of scattered light $R_2$ and $R_4$ from the second observation target.

FIG. 9 is an explanatory diagram illustrating radiation times $T_1$ and $T_2$ of the light pulses $P_1$ and $P_2$ radiated from the lidar device, reception times $T_1'$ and $T_3'$ of the scattered light beams $R_1$ and $R_3$ from the first observation target, and reception times $T_2'$ and $T_4'$ of the scattered light beams $R_2$ and $R_4$ from the second observation target.

In FIG. 9, the horizontal axis represents time, and the vertical axis represents light intensity.

The telescope 9 collects the light pulse $P_1$ scattered by the first observation target as scattered light $R_1$ and outputs the scattered light $R_1$ to the transmission and reception separating unit 8 (step ST6 in FIG. 6).

In the example of FIG. 9, since the distance $L_1$ from the lidar device to the first observation target is short, the scattered light $R_1$ from the first observation target is collected by the telescope 9 before the light pulse $P_2$ is radiated from the telescope 9. On the other hand, since the distance $L_2$ from the lidar device to the second observation target is long, the scattered light $R_2$ from the second observation target is collected by the telescope 9 after the light pulse $P_2$ is radiated from the telescope 9.

In the example of FIG. 9, after the light pulse $P_2$ is radiated from the telescope 9, the scattered light $R_2$ from the second observation target is collected by the telescope 9. However, this is merely an example, and the scattered light $R_2$ from the second observation target may be collected by the telescope 9 before the light pulse $P_2$ is radiated from the telescope 9.

In addition, in the example of FIG. 9, before the light pulse $P_2$ is radiated from the telescope 9, the scattered light $R_1$ from the first observation target is collected by the telescope 9. However, this is merely an example, and the scattered light $R_1$ from the first observation target may be collected by the telescope 9 after the light pulse $P_2$ is radiated from the telescope 9.

Upon receiving the scattered light $R_1$ from the first observation target from the telescope 9, the transmission and reception separating unit 8 outputs the scattered light $R_1$ to the receiving-side optical system 10.

Upon receiving the scattered light $R_1$ from the transmission and reception separating unit 8, the receiving-side optical system 10 shapes the scattered light $R_1$ and outputs the shaped scattered light $R_1$ to the optical multiplexing unit 12.

Upon receiving the shaped scattered light $R_1$ from the receiving-side optical system 10, the optical multiplexing unit 12 heterodyne-detects the multiplexed light $C_1$ by mixing the shaped scattered light $R_1$ and the reference light output from the light source 1 (step ST7 in FIG. 6). The optical frequency of the multiplexed light $C_1$ is $f_{IF1}+f_{dp1}$.

The optical multiplexing unit 12 outputs the multiplexed light $C_1$ to the optical receiving unit 13.

Upon receiving the multiplexed light $C_1$ from the optical multiplexing unit 12, the optical receiving unit 13 converts the multiplexed light $C_1$ into an electric signal and outputs the electric signal to the A/D conversion unit 14.

The A/D conversion unit 14 performs processing of converting the electric signal output from the optical receiving unit 13 from the analog signal into the digital signal Dig(t) during a period in which the pulse signal having the pulse width ΔT is output from the pulse signal generating unit 4a of the trigger generating unit 4.

The A/D conversion unit 14 outputs the digital signal Dig(t) including the detection signal $D_1$ of the multiplexed light $C_1$ to the range bin dividing unit 22 of the signal processing device 15.

When the period Trep elapses after the pulse signal is output, the pulse signal generating unit 4a of the trigger generating unit 4 outputs the pulse signal to each of the pulse modulator 5, the A/D conversion unit 14, and the signal processing device 15.

When the period Trep elapses after the reference signal is output to the first shift signal generating unit 4c, the reference signal generating unit 4b outputs the reference signal to the second shift signal generating unit 4d.

Upon receiving the reference signal from the reference signal generating unit 4b, the second shift signal generating unit 4d generates a second frequency shift signal indicating the modulation frequency $f_{IF2}$ from the reference signal (step ST8 in FIG. 6).

The second shift signal generating unit 4d outputs the second frequency shift signal to the switch 4e.

In the lidar device illustrated in FIG. 1, $f_{IF2}>f_{IF1}$, and the frequency difference $\Delta f(=f_{IF2}-f_{IF1})$ between the modulation frequency $f_{IF2}$ and the modulation frequency $f_{IF1}$ is larger than twice the absolute value of the Doppler frequency generated when each of the first observation target and the second observation target moves at the assumed maximum speed. When the frequency difference Δf is larger than twice the absolute value of the Doppler frequency, the optical frequencies of the scattered light beams $R_1$, $R_2$, $R_3$, and $R_4$ are different from each other as long as the moving speed of each of the first observation target and the second observation target is a speed within an assumed range.

Upon receiving the second frequency shift signal from the second shift signal generating unit 4d, the switch 4e outputs the second frequency shift signal to each of the pulse modulator 5 and the signal processing device 15.

When the second frequency shift signal is output from the switch 4e, the pulse modulator 5 shifts the optical frequency $f_0$ of the light pulse P to the optical frequency $f_0+f_{IF2}$ to generate the light pulse $P_2$ having the optical frequency $f_0+f_{IF2}$.

The pulse modulator 5 outputs the light pulse $P_2$ to the transmission-side optical system 7 (step ST9 in FIG. 6).

Upon receiving the light pulse $P_2$ from the pulse modulator 5, the transmission-side optical system 7 shapes the light pulse $P_2$ and outputs the shaped light pulse $P_2$ to the transmission and reception separating unit 8.

Upon receiving the shaped light pulse $P_2$ from the transmission-side optical system 7, the transmission and reception separating unit 8 outputs the shaped light pulse $P_2$ to the telescope 9.

The telescope 9 radiates the shaped light pulse $P_2$ output from the transmission and reception separating unit 8 to the space (step ST10 in FIG. 6).

The telescope 9 collects the light pulse $P_1$ scattered by the second observation target as scattered light $R_2$ and outputs the scattered light $R_2$ to the transmission and reception separating unit 8 (step ST11 in FIG. 6).

In addition, the telescope 9 collects the light pulse $P_2$ scattered by the first observation target as scattered light $R_3$ and outputs the scattered light $R_3$ to the transmission and reception separating unit 8 (step ST11 in FIG. 6).

In the example of FIG. 9, the scattered light $R_2$, which is the light pulse $P_1$ scattered by the second observation target, and the scattered light $R_3$, which is the light pulse $P_2$ scattered by the first observation target, are simultaneously collected by the telescope 9.

At the same time here, it is sufficient that a part of the scattered light $R_2$ and a part of the scattered light $R_3$ overlap each other, and the reception time of the scattered light $R_2$ and the reception time of the scattered light $R_3$ are not limited to exactly the same time. Therefore, at the same time here, the reception time of the scattered light $R_2$ and the reception time of the scattered light $R_3$ are slightly shifted from each other.

Upon receiving the scattered light $R_{2,3}$ in which the scattered light $R_2$ from the second observation object and the scattered light $R_3$ from the first observation object overlap each other from the telescope 9, the transmission and reception separating unit 8 outputs the scattered light beams $R_2$ and $R_3$ to the receiving-side optical system 10.

Upon receiving the scattered light beams $R_2$ and $R_3$ from the transmission and reception separating unit 8, the receiving-side optical system 10 shapes the scattered light $R_{2,3}$ and outputs the shaped scattered light $R_{2,3}$ to the optical multiplexing unit 12.

Upon receiving the shaped scattered light $R_{2,3}$ from the receiving-side optical system 10, the optical multiplexing unit 12 heterodyne-detects the multiplexed light beams $C_{2,3}$ by mixing the shaped scattered light beams $R_{2,3}$ and the reference light output from the light source 1 (step ST12 in FIG. 6). The optical frequencies of the multiplexed light $C_{2,3}$ are $f_{IF1}+f_{dp2}$ and $f_{IF2}+f_{dp1}$.

The optical multiplexing unit 12 outputs the multiplexed light $C_{2,3}$ to the optical receiving unit 13.

When receiving the multiplexed light $C_{2,3}$ from the optical multiplexing unit 12, the optical receiving unit 13 converts the multiplexed light beams $C_{2,3}$ into an electric signal and outputs the electric signal to the A/D conversion unit 14.

The A/D conversion unit 14 performs processing of converting the electric signal output from the optical receiving unit 13 from the analog signal into the digital signal Dig(t) during a period in which the pulse signal having the pulse width ΔT is output from the pulse signal generating unit 4a of the trigger generating unit 4.

The A/D conversion unit 14 outputs the digital signal Dig(t) including the detection signal $D_{2,3}$ of the multiplexed light beams $C_{2,3}$ to the range bin dividing unit 22 of the signal processing device 15.

Thereafter, the telescope 9 collects the light pulse $P_2$ scattered by the second observation target as scattered light $R_4$, and outputs the scattered light $R_4$ to the transmission and reception separating unit 8 (step ST13 in FIG. 6).

Upon receiving the scattered light $R_4$ from the second observation target from the telescope 9, the transmission and reception separating unit 8 outputs the scattered light $R_4$ to the receiving-side optical system 10.

Upon receiving the scattered light $R_4$ from the transmission and reception separating unit 8, the receiving-side optical system 10 shapes the scattered light $R_4$ and outputs the shaped scattered light $R_4$ to the optical multiplexing unit 12.

Upon receiving the shaped scattered light $R_4$ from the receiving-side optical system 10, the optical multiplexing unit 12 heterodyne-detects the multiplexed light $C_4$ by mixing the shaped scattered light $R_4$ and the reference light output from the light source 1 (step ST14 in FIG. 6). The optical frequency of the multiplexed light $C_4$ is $f_{IF2}+f_{dp2}$.

The optical multiplexing unit 12 outputs the multiplexed light $C_4$ to the optical receiving unit 13.

Upon receiving the multiplexed light $C_4$ from the optical multiplexing unit 12, the optical receiving unit 13 converts the multiplexed light $C_4$ into an electric signal and outputs the electric signal to the A/D conversion unit 14.

The A/D conversion unit 14 performs processing of converting the electric signal output from the optical receiving unit 13 from the analog signal into the digital signal Dig(t) during a period in which the pulse signal having the pulse width ΔT is output from the pulse signal generating unit 4a of the trigger generating unit 4.

The A/D conversion unit 14 outputs the digital signal Dig(t) including the detection signal $D_4$ of the multiplexed light $C_4$ to the range bin dividing unit 22 of the signal processing device 15.

Upon receiving the digital signal Dig(t) from the A/D conversion unit 14, the range bin dividing unit 22 divides the digital signal Dig(t) in the time direction (step ST21 in FIG. 7).

The division width Δt in the time direction of the digital signal Dig(t) corresponds to the range bin width Rbw.

As illustrated in FIG. 11, it is assumed that the telescope 9 radiates the light pulse $P_1$ at the sampling time t=0 corresponding to the range bin (0) and radiates the light pulse $P_2$ at the sampling time t=6 corresponding to the range bin (6).

Then, it is assumed that the distance $L_1$ from the lidar device to the first observation target corresponds to the distance of the range bin (1), and the distance $L_2$ from the lidar device to the second observation target corresponds to the distance of the range bin (7).

In this case, the divided digital signal Dig(1) includes the detection signal $D_1$ of the multiplexed light $C_1$, the divided digital signal Dig(7) includes the detection signal $D_{2,3}$ of the multiplexed light $C_{2,3}$, and the divided digital signal Dig(13) includes the detection signal $D_4$ of the multiplexed light $C_4$.

The range bin dividing unit 22 outputs each of the divided digital signals Dig(t) to the frequency analysis unit 23 as a range bin signal (n).

The frequency analysis unit 23 calculates the frequency spectrum FS(n) of each range bin signal (n) by performing FFT processing on each range bin signal (n) output from the range bin dividing unit 22 (step ST22 in FIG. 7).

The frequency analysis unit 23 outputs each frequency spectrum FS(n) to the range correcting unit 24.

Figure 10A:
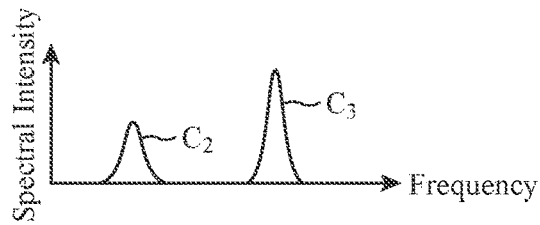
FIG. 10A is an explanatory diagram illustrating a peak spectrum of a range bin signal (7)

The range bin signal (7) includes the detection signal $D_{2,3}$ of the multiplexed light $C_{2,3}$. Since the optical frequency $f_{IF1}+f_{dp2}$ of the multiplexed light $C_2$ is different from the optical frequency $f_{IF2}+f_{dp1}$ of the multiplexed light $C_3$, the range bin signal (7) has two peak spectra as illustrated in FIG. 10A.

The range bin signal (1) includes the detection signal $D_1$ of the multiplexed light $C_1$. Thus, the range bin signal (1) has one peak spectrum.

The range bin signal (13) includes the detection signal $D_4$ of the multiplexed light $C_4$. Thus, the range bin signal (13) has one peak spectrum.

The range bin signal (n) other than the range bin signals (1), (7), and (13) does not have a peak spectrum, and the frequency spectrum of the range bin signal (n) is substantially 0.

FIG. 10A is an explanatory diagram illustrating a peak spectrum of the range bin signal (7).

Figure 10B:
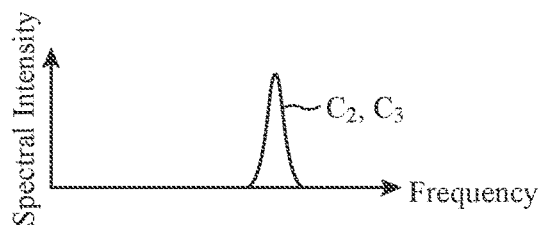
FIG. 10B is an explanatory diagram illustrating a peak spectrum of the range bin signal (7) in a case where an optical frequency of the light pulse $P_1$ and an optical frequency of the light pulse $P_2$ are the same frequency.

FIG. 10B is an explanatory diagram illustrating a peak spectrum of the range bin signal (7) in a case where the optical frequency of the light pulse $P_1$ and the optical frequency of the light pulse $P_2$ are the same frequency. In the case of FIG. 10B, the multiplexed light $C_2$ and the multiplexed light $C_3$ cannot be identified.

In FIGS. 10A and 10B, the horizontal axis represents time, and the vertical axis represents spectral intensity.

The range correcting unit 24 acquires each frequency spectrum FS(n) from the frequency analysis unit 23.

The range correcting unit 24 acquires the first frequency shift signal and the second frequency shift signal from the trigger generating unit 4.

The range correcting unit 24 detects a plurality of peak spectra from each frequency spectrum FS(n).

That is, the range correcting unit 24 detects the peak spectrum $S_{p1}$ from the frequency spectrum FS(1).

The range correcting unit 24 detects the peak spectrum $S_{p2}$ and the peak spectrum $S_{p3}$ from the frequency spectrum FS(7).

Further, the range correcting unit 24 detects the peak spectrum $S_{p4}$ from the frequency spectrum FS(13).

Further, the range correcting unit 24 detects the peak frequency $f_{p1}$ corresponding to the peak spectrum $S_{p1}$ and detects the peak frequency $f_{p2}$ corresponding to the peak spectrum $S_{p2}$.

The range correcting unit 24 detects the peak frequency $f_{p3}$ corresponding to the peak spectrum $S_{p3}$ and detects the peak frequency $f_{p4}$ corresponding to the peak spectrum $S_{p4}$.

The range correcting unit 24 calculates an absolute value $|\Delta f_{1-1}|$ of a difference between the peak frequency $f_{p1}$ and the modulation frequency $f_{IF1}$ indicated by the first frequency shift signal, and calculates an absolute value $|\Delta f_{1-2}|$ of a difference between the peak frequency $f_{p1}$ and the modulation frequency $f_{IF2}$ indicated by the second frequency shift signal.

If the absolute value $|\Delta f_{1-1}|$ of the difference is equal to or less than the absolute value $|\Delta f_{1-2}|$ of the difference, the range correcting unit 24 determines that the multiplexed light having the peak spectrum $S_{p1}$ is the multiplexed light $C_1$ corresponding to the light pulse $P_1$ or the multiplexed light $C_2$ corresponding to the light pulse $P_1$.

If the absolute value $|\Delta f_{1-1}|$ of the difference is larger than the absolute value $|\Delta f_{1-2}|$ of the difference, the range correcting unit 24 determines that the multiplexed light having the peak spectrum $S_{p1}$ is the multiplexed light $C_3$ corresponding to the light pulse $P_2$ or the multiplexed light $C_4$ corresponding to the light pulse $P_2$.

The range correcting unit 24 calculates an absolute value $|\Delta f_{2-1}|$ of a difference between the peak frequency $f_{p2}$ and the modulation frequency $f_{IF1}$, and calculates an absolute value $|\Delta f_{2-2}|$ of a difference between the peak frequency $f_{p2}$ and the modulation frequency $f_{IF2}$.

If the absolute value $|\Delta f_{2-1}|$ of the difference is equal to or less than the absolute value $|\Delta f_{2-2}|$ of the difference, the range correcting unit 24 determines that the multiplexed light having the peak spectrum $S_{p3}$ is the multiplexed light $C_1$ corresponding to the light pulse $P_1$ or the multiplexed light $C_2$ corresponding to the light pulse $P_1$.

If the absolute value $|\Delta f_{2-1}|$ of the difference is larger than the absolute value $|\Delta f_{2-2}|$ of the difference, the range correcting unit 24 determines that the multiplexed light having the peak spectrum $S_{p2}$ is the multiplexed light $C_3$ corresponding to the light pulse $P_2$ or the multiplexed light $C_4$ corresponding to the light pulse $P_2$.

The range correcting unit 24 calculates an absolute value $|\Delta f_{3-1}|$ of a difference between the peak frequency $f_{p3}$ and the modulation frequency $f_{IF1}$, and calculates an absolute value $|\Delta f_{3-2}|$ of a difference between the peak frequency $f_{p3}$ and the modulation frequency $f_{IF2}$.

If the absolute value $|\Delta f_{3-1}|$ of the difference is equal to or less than the absolute value $|\Delta f_{3-2}|$ of the difference, the range correcting unit 24 determines that the multiplexed light having the peak spectrum Spa is the multiplexed light $C_1$ corresponding to the light pulse $P_1$ or the multiplexed light $C_2$ corresponding to the light pulse $P_1$.

If the absolute value $|\Delta f_{3-1}|$ of the difference is larger than the absolute value $|\Delta f_{3-2}|$ of the difference, the range correcting unit 24 determines that the multiplexed light having the peak spectrum $S_{p3}$ is the multiplexed light $C_3$ corresponding to the light pulse $P_2$ or the multiplexed light $C_4$ corresponding to the light pulse $P_2$.

The range correcting unit 24 calculates an absolute value $|\Delta f_{4-1}|$ of a difference between the peak frequency $f_{p4}$ and the modulation frequency $f_{IF1}$, and calculates an absolute value $|\Delta f_{4-2}|$ of a difference between the peak frequency $f_{p4}$ and the modulation frequency $f_{IF2}$.

If the absolute value $|\Delta f_{4-1}|$ of the difference is equal to or less than the absolute value $|\Delta f_{4-2}|$ of the difference, the range correcting unit 24 determines that the multiplexed light having the peak spectrum $S_{p4}$ is the multiplexed light $C_1$ corresponding to the light pulse $P_1$ or the multiplexed light $C_2$ corresponding to the light pulse $P_1$.

If the absolute value $|\Delta f_{4-1}|$ of the difference is larger than the absolute value $|\Delta f_{4-2}|$ of the difference, the range correcting unit 24 determines that the multiplexed light having the peak spectrum $S_{p4}$ is the multiplexed light $C_3$ corresponding to the light pulse $P_2$ or the multiplexed light $C_4$ corresponding to the light pulse $P_2$.

Here, for convenience of description, it is assumed that each of the multiplexed light having the peak spectrum $S_{p1}$ and the multiplexed light having the peak spectrum $S_{p2}$ is the multiplexed light $C_1$ corresponding to the light pulse $P_1$ or the multiplexed light $C_2$ corresponding to the light pulse $P_1$.

In addition, it is assumed that each of the multiplexed light having the peak spectrum $S_{p3}$ and the multiplexed light having the peak spectrum $S_{p4}$ is the multiplexed light $C_3$ corresponding to the light pulse $P_2$ or the multiplexed light $C_4$ corresponding to the light pulse $P_2$.

In this case, if the range bin of the peak spectrum $S_{p1}$ is equal to or less than the range bin of the peak spectrum $S_{p2}$, the range correcting unit 24 determines that the multiplexed light having the peak spectrum $S_{p1}$ is the multiplexed light $C_1$ corresponding to the light pulse $P_1$ and the multiplexed light having the peak spectrum $S_{p2}$ is the multiplexed light $C_2$ corresponding to the light pulse $P_1$.

If the range bin of the peak spectrum $S_{p1}$ is larger than the range bin of the peak spectrum $S_{p2}$, the range correcting unit 24 determines that the multiplexed light having the peak spectrum $S_{p1}$ is the multiplexed light $C_2$ corresponding to the light pulse $P_1$ and the multiplexed light having the peak spectrum $S_{p2}$ is the multiplexed light $C_1$ corresponding to the light pulse $P_1$.

In addition, if the range bin of the peak spectrum $S_{p3}$ is equal to or less than the range bin of the peak spectrum $S_{p4}$, the range correcting unit 24 determines that the multiplexed light having the peak spectrum $S_{p3}$ is the multiplexed light $C_3$ corresponding to the light pulse $P_2$ and the multiplexed light having the peak spectrum $S_{p4}$ is the multiplexed light $C_4$ corresponding to the light pulse $P_2$.

If the range bin of the peak spectrum $S_{p3}$ is larger than the range bin of the peak spectrum $S_{p4}$, the range correcting unit 24 determines that the multiplexed light having the peak spectrum $S_{p3}$ is the multiplexed light $C_4$ corresponding to the light pulse $P_2$ and the multiplexed light having the peak spectrum $S_{p4}$ is the multiplexed light $C_3$ corresponding to the light pulse $P_2$.

Here, for convenience of description, it is assumed that the multiplexed light having the peak spectrum $S_{p1}$ is the multiplexed light $C_1$ and the multiplexed light having the peak spectrum $S_{p2}$ is the multiplexed light $C_2$. In addition, it is assumed that the multiplexed light having the peak spectrum $S_{p3}$ is the multiplexed light $C_3$ and the multiplexed light having the peak spectrum $S_{p4}$ is the multiplexed light $C_4$.

When determining that the multiplexed light beams $C_1$ and $C_2$ are the multiplexed light beams corresponding to the light pulse $P_1$ and the multiplexed light beams $C_3$ and $C_4$ are the multiplexed light beams corresponding to the light pulse $P_2$, the range correcting unit 24 corrects the range bin (7) in which the multiplexed light $C_3$ is present and the range bin (13) in which the multiplexed light $C_4$ is present as illustrated in FIG. 11.

That is, the range correcting unit 24 corrects the range bin (7) in which the multiplexed light $C_3$ is present to the range bin (1) by subtracting the period Trep (=6) from the range bin (7) in which the multiplexed light $C_3$ is present (step ST23 in FIG. 7).

In addition, the range correcting unit 24 corrects the range bin (13) in which the multiplexed light $C_4$ is present to the range bin (7) by subtracting the period Trep (=6) from the range bin (13) in which the multiplexed light $C_4$ is present (step ST23 in FIG. 7).

FIG. 11 is an explanatory diagram illustrating a range bin in which the scattered light $R_1$ related to the multiplexed light $C_1$ is present, a range bin in which the scattered light beams $R_2$ and $R_3$ related to the multiplexed light beams $C_2$ and $C_3$ are present, and a range bin in which the scattered light $R_4$ related to the multiplexed light $C_4$ is present.

In FIG. 11, the horizontal axis represents time, and the vertical axis represents light intensity. In FIG. 11, the range bin is simplified to "range".

In the example of FIG. 11, the range bin in which the scattered light $R_1$ is present is the range bin (1), the range bin in which the scattered light beams $R_2$ and $R_3$ are present is the range bin (7), and the range bin in which the scattered light $R_4$ is present is the range bin (13).

A time difference between the radiation time $T_1$ of the light pulse $P_1$ and the radiation time $T_2$ of the light pulse $P_2$ corresponds to the range bin (6), and the period Trep is 6. Therefore, n' that is the corrected range bin in which the scattered light $R_3$ related to the multiplexed light $C_3$ is present is 1 (=7−6), and n' that is the corrected range bin in which the scattered light $R_4$ related to the multiplexed light $C_4$ is present is 7 (=13−6).

The range correcting unit 24 outputs the frequency spectrum FS(n) for the range bin (n) in which the scattered light beams $R_1$ and $R_2$ related to the multiplexed light beams $C_1$ and $C_2$ are present among the plurality of frequency spectra FS(1) to FS(N) to the frequency correction processing unit 25.

In addition, the range correcting unit 24 outputs the frequency spectrum FS(n') for the corrected range bin (n') in which the scattered light beams $R_3$ and $R_4$ related to the multiplexed light beams $C_3$ and $C_4$ are present among the plurality of frequency spectra FS(1) to FS(N) to the frequency correction processing unit 25.

The range correcting unit 24 outputs the optical frequency $f_{IF1}+f_{dp1}$ (=$f_{p1}$) of the multiplexed light $C_1$, the optical frequency $f_{IF1}+f_{dp2}$ (=$f_{p2}$) of the multiplexed light $C_2$, the optical frequency $f_{IF2}+f_{dp1}$ (=$f_{p3}$) of the multiplexed light $C_3$, and the optical frequency $f_{IF2}+f_{dp2}$ (=$f_{p4}$) of the multiplexed light $C_4$ to the frequency correction processing unit 25.

The range correcting unit 24 outputs the range bin in which the scattered light $R_1$ related to the multiplexed light $C_1$ is present and the range bin in which the scattered light $R_2$ related to the multiplexed light $C_2$ is present to the distance characteristic calculating unit 31.

The frequency correction processing unit 25 acquires the first frequency shift signal and the second frequency shift signal from the trigger generating unit 4.

The frequency correction processing unit 25 calculates a frequency difference $\Delta f$ (=$f_{IF2}"f_{IF1}$) between the modulation frequency $f_{IF1}$ indicated by the first frequency shift signal and the modulation frequency $f_{IF2}$ indicated by the second frequency shift signal.

The frequency correction processing unit 25 acquires, from the range correcting unit 24, the frequency spectrum FS(n) for the range bin (n) in which the scattered light beams $R_1$ and $R_2$ related to the multiplexed light beams $C_1$ and $C_2$ are present and the frequency spectrum FS(n') for the corrected range bin (n') in which the scattered light beams $R_3$ and $R_4$ related to the multiplexed light beams $C_3$ and $C_4$ are present.

The frequency correction processing unit 25 acquires the optical frequency $f_{IF1}+f_{dp1}$ of the multiplexed light $C_1$, the optical frequency $f_{IF1}+f_{dp2}$ of the multiplexed light $C_2$, the optical frequency $f_{IF2}+f_{dp1}$ of the multiplexed light $C_3$, and the optical frequency $f_{IF2}+f_{dp2}$ of the multiplexed light $C_4$ from the range correcting unit 24.

The frequency correction processing unit 25 corrects the optical frequency of the multiplexed light $C_3$ by subtracting the frequency difference $\Delta f$ from the optical frequency $f_{IF2}+f_{dp1}$ of the multiplexed light $C_3$ (step ST24 in FIG. 7). The corrected optical frequency of the multiplexed light $C_3$ is $f_{IF1}+f_{dp1}$, which is the same frequency as the optical frequency $f_{IF1}+f_{dp1}$ of the multiplexed light $C_1$.

The frequency correction processing unit 25 corrects the optical frequency of the multiplexed light $C_4$ by subtracting the frequency difference $\Delta f$ from the optical frequency $f_{IF2}+f_{dp2}$ of the multiplexed light $C_4$ (step ST24 in FIG. 7). The corrected optical frequency of the multiplexed light $C_4$ is $f_{IF1}+f_{dp2}$, which is the same frequency as the optical frequency $f_{IF1}+f_{dp2}$ of the multiplexed light $C_2$.

The frequency correction processing unit 25 outputs the frequency spectrum FS(n=1) for the range bin (n=1) in which the scattered light $R_1$ related to the multiplexed light $C_1$ is present to the spectrum integrating unit 26.

The frequency correction processing unit 25 outputs the frequency spectrum FS(n=7) for the range bin (n=7) in which the scattered light $R_2$ related to the multiplexed light $C_2$ is present to the spectrum integrating unit 26.

The frequency correction processing unit 25 changes the optical frequency of the frequency spectrum FS(n'=1) for the corrected range bin (n'=1) in which the scattered light $R_3$ related to the multiplexed light $C_3$ is present to the corrected optical frequency $f_{IF1}+f_{dp1}$ of the multiplexed light $C_3$.

The frequency correction processing unit 25 outputs the frequency spectrum FS(n'=1) after the optical frequency change to the spectrum integrating unit 26.

The frequency correction processing unit 25 changes the optical frequency of the frequency spectrum FS(n'=7) for the corrected range bin (n'=7) in which the scattered light $R_4$ related to the multiplexed light $C_4$ is present to the corrected optical frequency $f_{IF1}+f_{dp2}$ of the multiplexed light $C_4$.

The frequency correction processing unit 25 outputs the frequency spectrum FS(n'=7) after the optical frequency change to the spectrum integrating unit 26.

The spectrum integrating unit 26 acquires, from the frequency correction processing unit 25, the frequency spectrum FS(n=1), the frequency spectrum FS(n=7), the frequency spectrum FS(n'=1) after the optical frequency change, and the frequency spectrum FS(n'=7) after the optical frequency change.

The spectrum integrating unit 26 integrates the frequency spectrum FS(n=1), the frequency spectrum FS(n=7), the frequency spectrum FS(n'=1) after the optical frequency change, and the frequency spectrum FS(n'=7) after the optical frequency change (step ST25 in FIG. 7). By being integrated by the spectrum integrating unit 26, the spectrum intensity of the frequency spectrum corresponding to the optical frequency $f_{IF1}+f_{dp1}$ and the spectrum intensity of the frequency spectrum corresponding to the optical frequency $f_{IF1}+f_{dp2}$ are increased.

The spectrum integrating unit 26 outputs the integrated frequency spectrum $\Sigma$HFS to the peak frequency detecting unit 27.

The peak frequency detecting unit 27 acquires the integrated frequency spectrum $\Sigma$HFS from the spectrum integrating unit 26.

The peak frequency detecting unit 27 specifies spectral intensities $FS_{max1}$ and $FS_{max2}$ equal to or greater than a threshold value among a plurality of spectral intensities included in the integrated frequency spectrum $\Sigma$HFS. Since the first observation target and the second observation target are present in space, two spectral intensities $FS_{max1}$ and $FS_{max2}$ are specified.

The peak frequency detecting unit 27 outputs the peak frequency $f_{peak1}$ corresponding to the spectral intensity $FS_{max1}$ and the peak frequency $f_{peak2}$ corresponding to the spectral intensity $FS_{max2}$ to the frequency calculation processing unit 28 (step ST26 in FIG. 7).

The peak frequency $f_{peak1}$ corresponds to each of the optical frequency $f_{IF1}+f_{dp1}$ of the multiplexed light $C_1$ and the optical frequency $f_{IF1}+f_{dp1}$ of the multiplexed light $C_3$ after the optical frequency correction.

The peak frequency $f_{peak2}$ corresponds to each of the optical frequency $f_{IF1}+f_{dp2}$ of the multiplexed light $C_2$ and the optical frequency $f_{IF1}+f_{dp2}$ of the multiplexed light $C_4$ after the optical frequency correction.

In addition, the peak frequency detecting unit 27 outputs the integrated frequency spectrum $\Sigma$HFS to the SNR calculating unit 30.

The frequency calculation processing unit 28 acquires the peak frequencies $f_{peak1}$ and $f_{peak2}$ from the peak frequency detecting unit 27.

The frequency calculation processing unit 28 acquires the first frequency shift signal and the second frequency shift signal from the trigger generating unit 4.

The frequency calculation processing unit 28 calculates the Doppler frequency $f_{dp1}$ included in the optical frequency $f_{IF1}+f_{dp1}$ of each of the multiplexed light $C_1$ and the multiplexed light $C_3$ after optical frequency correction by subtracting the modulation frequency $f_{IF1}$ indicated by the first frequency shift signal from the peak frequency $f_{peak1}$ (step ST27 in FIG. 7).

The frequency calculation processing unit 28 calculates the Doppler frequency $f_{dp2}$ included in the optical frequency $f_{IF1}+f_{dp2}$ of each of the multiplexed light $C_2$ and the multiplexed light $C_4$ after optical frequency correction by subtracting the modulation frequency $f_{IF2}$ indicated by the second frequency shift signal from the peak frequency $f_{peak2}$ (step ST27 in FIG. 7).

The frequency calculation processing unit 28 outputs the Doppler frequencies $f_{dp1}$ and $f_{dp2}$ to a speed calculation processing unit 29.

The speed calculation processing unit 29 acquires the Doppler frequencies $f_{dp1}$ and $f_{dp2}$ from the frequency calculation processing unit 28.

The speed calculation processing unit 29 calculates the relative speed $V_1$ of the first observation target from the Doppler frequency $f_{dp1}$ as expressed in the following Formula (1) (step ST28 in FIG. 7).

$$V_1 = \lambda \times f_{dp1}/2 \quad (1)$$

In Formula (1), $\lambda$ is a wavelength of each of the light pulses $P_1$ and $P_2$.

The speed calculation processing unit 29 calculates the relative speed $V_2$ of the second observation target from the Doppler frequency $f_{dp2}$ as expressed in the following Formula (2) (step ST28 in FIG. 7).

$$V_2 = \lambda f_{dp2}/2 \quad (2)$$

The speed calculation processing unit 29 displays each of the relative speed $V_1$ of the first observation target and the relative speed $V_2$ of the second observation target on, for example, a display device (not illustrated).

The SNR calculating unit 30 acquires the integrated frequency spectrum $\Sigma$HFS from the peak frequency detecting unit 27.

The SNR calculating unit 30 calculates a signal of each range bin (n) by performing inverse FFT processing on the integrated frequency spectrum $\Sigma$HFS.

The SNR calculating unit 30 calculates the SNR of each range bin (n) by dividing the signal of each range bin (n) by the out-of-band noise.

The SNR calculating unit 30 outputs the SNR of each range bin (n) to the distance characteristic calculating unit 31.

The distance characteristic calculating unit 31 acquires, from the range correcting unit 24, a range bin (n=1) in which the scattered light $R_1$ related to the multiplexed light $C_1$ is present and a range bin (n=7) in which the scattered light $R_2$ related to the multiplexed light $C_2$ is present.

The distance characteristic calculating unit 31 calculates the distance $L_1$ from the lidar device to the first observation target from the range bin (n=1) in which the scattered light $R_1$ related to the multiplexed light $C_1$ is present, the A/D conversion rate Rate of the A/D conversion unit 14, and the range bin width Rbw as expressed in the following Formula (3).

$$L_1 = c \times \text{Rate} \times n/2 \qquad (3)$$
$$= c \times \text{Rate} \times 1/2$$

In Formula (3), c represents the speed of light.

The distance characteristic calculating unit 31 calculates the distance $L_2$ from the lidar device to the second observation target from the range bin (n=7) in which the scattered light $R_2$ related to the multiplexed light $C_2$ is present, the A/D conversion rate Rate of the A/D conversion unit 14, and the range bin width Rbw as expressed in the following Formula (4).

$$L_2 = c \times \text{Rate} \times n/2 \qquad (4)$$
$$= c \times \text{Rate} \times 7/2$$

Figure 12:
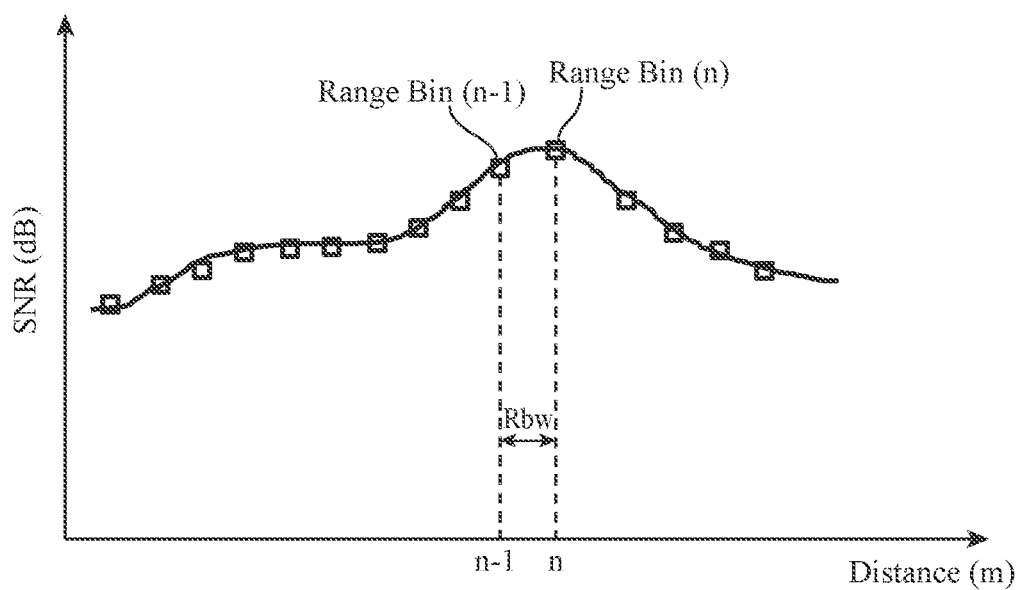
FIG. 12 is an explanatory diagram of a distance characteristic (a-scope) indicating a correspondence relationship between a distance of a range bin (n) and SNR.

As illustrated in FIG. 12, the distance characteristic calculating unit 31 displays a distance characteristic (a-scope) indicating a correspondence relationship between the distance of the range bin (n) and the SNR calculated by the SNR calculating unit 30 on a display device (not illustrated).

FIG. 12 is an explanatory diagram of the distance characteristic (a-scope) indicating the correspondence relationship between the distance of the range bin (n) and the SNR.

In FIG. 12, the horizontal axis represents the distance [m] of the range bin (n), and the vertical axis represents SNR [dB].

In the first embodiment described above, the signal processing device 15 is configured to calculate the relative speed of each observation target with respect to the lidar device as the moving speed of each of the plurality of observation targets present in the space. A plurality of light pulses having different optical frequencies are generated from the laser beam output from the light source 1, each of the light pulses is radiated into the space, each of the light pulses scattered by each observation target is received as scattered light, and a multiplexed light of each scattered light and the laser beam is detected. The signal processing device 15 includes: a Doppler frequency calculating unit 16 to calculate a Doppler frequency that is included in an optical frequency of the scattered light and due to movement of each of the observation targets from the optical frequency of each of the plurality of generated light pulses and a detection signal of the multiplexed light; and a speed calculating unit 17 to calculate a relative speed of each of the observation targets from the Doppler frequency calculated by the Doppler frequency calculating unit 16. Therefore, even in a state where the far scattered light and the near scattered light overlap each other, the signal processing device 15 can calculate the moving speed of each observation target regardless of whether or not the moving speed of the far observation target and the moving speed of the near observation target are the same.

The lidar device shown in FIG. 1 includes a plurality of components that handle light, and each component is connected to another component by an optical fiber. In addition, each component transmits and receives light to and from another component via the optical fiber. However, this is merely an example, and each component may transmit and receive light to and from another component by spatial propagation. The plurality of components are the light source 1, the light division unit 3, the pulse modulator 5, the transmission-side optical system 7, the transmission and reception separating unit 8, the telescope 9, the receiving-side optical system 10, the optical multiplexing unit 12, and the optical receiving unit 13.

In the signal processing device 15 illustrated in FIG. 3, the Doppler frequency calculating unit 16 includes an optical frequency correcting unit 21 and a frequency calculation processing unit 28. In addition, the optical frequency correcting unit 21 includes a range bin dividing unit 22, a frequency analysis unit 23, a range correcting unit 24, a frequency correction processing unit 25, and a spectrum integrating unit 26 in order to increase the SNR of each of the detection signals $D_1$, $D_2$, $D_3$, and $D_4$.

However, the optical frequency correcting unit 21 does not have to include the range bin dividing unit 22, the frequency analysis unit 23, the range correcting unit 24, the frequency correction processing unit 25, and the spectrum integrating unit 26 as long as the Doppler frequencies $V_1$ and $V_2$ due to the movement of the observation targets can be calculated without increasing the SNRs of the detection signals $D_1$ and $D_2$.

In a case where the optical frequency correcting unit 21 does not include the range bin dividing unit 22, the frequency analysis unit 23, the range correcting unit 24, the frequency correction processing unit 25, and the spectrum integrating unit 26, the peak frequency detecting unit 27 performs FFT processing on each of the detection signals $D_1$ and $D_2$ to obtain a frequency spectrum of each of the detection signals $D_1$ and Dz. Then, the peak frequency detecting unit 27 specifies spectral intensities $FS_{max1}$ and $FS_{max2}$ equal to or greater than the threshold value among the plurality of spectral intensities included in each frequency spectrum. The peak frequency detecting unit 27 outputs the peak frequency $f_{peak1}$ corresponding to the spectral intensity $FS_{max1}$ and the peak frequency $f_{peak2}$ corresponding to the spectral intensity $FS_{max2}$ to the frequency calculation processing unit 28.

Second Embodiment

In the second embodiment, a lidar device in which the pulse modulator 5 includes an optical branching unit 5a, a first modulation unit 5b, a second modulation unit 5c, and an optical multiplexing unit 5d will be described.

The configuration of the lidar device according to the second embodiment is similar to the configuration of the lidar device according to the first embodiment, and a configuration diagram illustrating the lidar device according to the second embodiment is FIG. 1.

Figure 13:
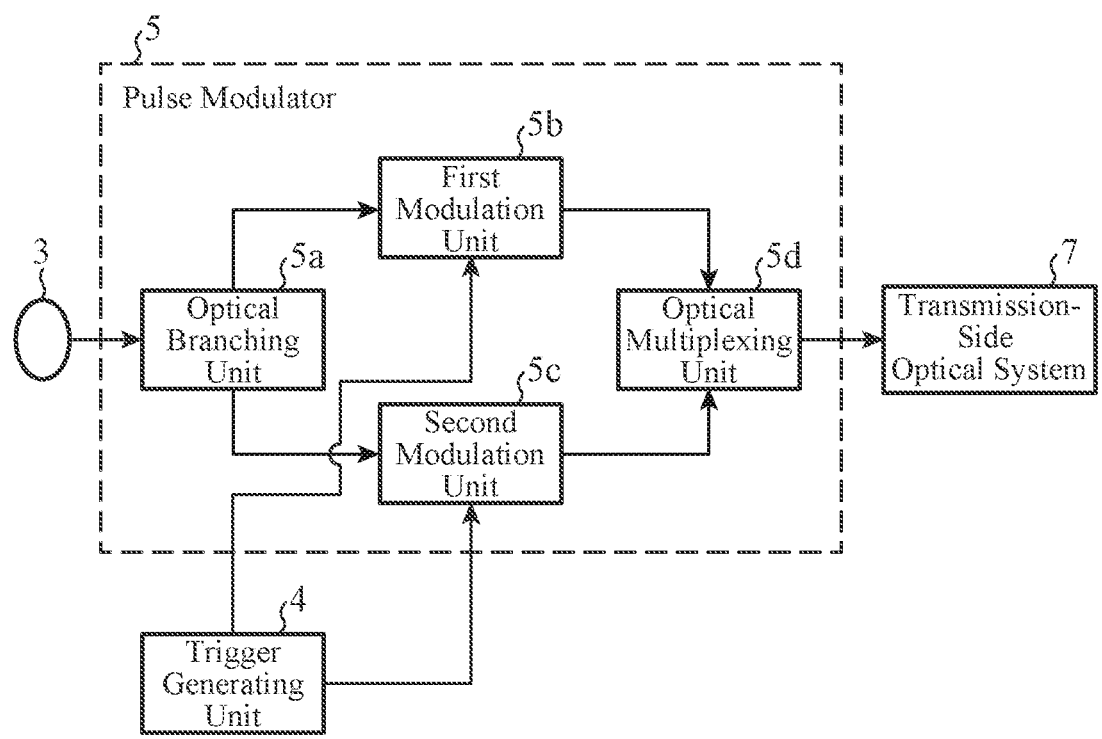
FIG. 13 is a configuration diagram illustrating a pulse modulator 5 of a lidar device according to a second embodiment.

FIG. 13 is a configuration diagram illustrating the pulse modulator 5 of the lidar device according to the second embodiment.

The pulse modulator 5 illustrated in FIG. 13 includes an optical branching unit 5a, a first modulation unit 5b, a second modulation unit 5c, and an optical multiplexing unit 5d.

The optical branching unit 5a is implemented by a coupler, an optical switch, or the like.

The optical branching unit 5a branches the laser beam output from the light division unit 3 into two, outputs one of the laser beams branched into two to the first modulation unit 5b, and outputs the other of the laser beams branched into two to the second modulation unit 5c.

The optical branching unit 5a illustrated in FIG. 13 branches the laser beam output from the light division unit 3 into two. However, this is merely an example, and the optical branching unit 5a may be a switch that alternately switches the output destination of the laser beam output from the light division unit 3 to the first modulation unit 5b or the second modulation unit 5c.

The first modulation unit 5b is implemented by, for example, a modulation element using an acousto-optic element or a modulation element using a lithium niobate crystal, and an optical amplifier such as a semiconductor optical amplifier.

Every time a pulse signal having a pulse width $\Delta T$ is received from the pulse signal generating unit 4a, the first modulation unit 5b performs pulse modulation on the laser beam output from the optical branching unit 5a according to the pulse signal, thereby converting the laser beam into a light pulse having a pulse width $\Delta T$.

In addition, the first modulation unit 5b shifts the optical frequency $f_0$ of the light pulse to the optical frequency $f_0+f_{IF1}$ according to the first frequency shift signal output from the switch 4e of the trigger generating unit 4, thereby generating the light pulse $P_1$ having the optical frequency $f_0+f_{IF1}$.

The first modulation unit 5b outputs the light pulse $P_1$ to the optical multiplexing unit 5d.

The second modulation unit 5c is implemented by, for example, a modulation element using an acousto-optic element or a modulation element using a lithium niobate crystal, and an optical amplifier such as a semiconductor optical amplifier.

Every time a pulse signal having a pulse width $\Delta T$ is received from the pulse signal generating unit 4a, the second modulation unit 5c performs pulse modulation on the laser beam output from the optical branching unit 5a according to the pulse signal, thereby converting the laser beam into a light pulse having a pulse width $\Delta T$.

In addition, the second modulator unit 5c shifts the optical frequency $f_0$ of the light pulse to the optical frequency $f_0+f_{IF2}$ according to the second frequency shift signal output from the switch 4e of the trigger generating unit 4, thereby generating the light pulse $P_2$ having the optical frequency $f_0+f_{IF2}$.

The second modulation unit 5c outputs the light pulse $P_2$ to the optical multiplexing unit 5d.

Upon receiving the light pulse $P_1$ from the first modulation unit 5b, the optical multiplexing unit 5d outputs the light pulse $P_1$ to the transmission-side optical system 7.

Upon receiving the light pulse $P_2$ from the second modulation unit 5c, the optical multiplexing unit 5d outputs the light pulse $P_2$ to the transmission-side optical system 7.

Next, the operation of the lidar device according to the second embodiment will be described. Since the components other than the pulse modulator 5 are similar to those of the lidar device illustrated in FIG. 1, the operation of the pulse modulator 5 will be mainly described here.

Upon receiving a laser beam that is continuous light from the light division unit 3, the optical branching unit 5a branches the laser beam into two.

The optical branching unit 5a outputs one of the laser beams branched into two to the first modulation unit 5b, and outputs the other of the laser beams branched into two to the second modulation unit 5c.

Every time a pulse signal having a pulse width $\Delta T$ is received from the pulse signal generating unit 4a, the first modulation unit 5b performs pulse modulation on the laser beam output from the optical branching unit 5a according to the pulse signal, thereby converting the laser beam into a light pulse having a pulse width $\Delta T$.

Upon receiving the first frequency shift signal from the switch 4e of the trigger generating unit 4, the first modulation unit 5b shifts the optical frequency $f_0$ of the light pulse to the optical frequency $f_0+f_{IF1}$ according to the first frequency shift signal, thereby generating the light pulse $P_1$ having the optical frequency $f_0+f_{IF1}$.

The first modulation unit 5b outputs the light pulse $P_1$ to the optical multiplexing unit 5d.

Every time a pulse signal having a pulse width $\Delta T$ is received from the pulse signal generating unit 4a, the second modulation unit 5c performs pulse modulation on the laser beam output from the optical branching unit 5a according to the pulse signal, thereby converting the laser beam into a light pulse having a pulse width $\Delta T$.

When the period Trep elapses after the first frequency shift signal is output to the first modulation unit 5b, the switch 4e of the trigger generating unit 4 outputs the second frequency shift signal to the second modulation unit 5c.

Upon receiving the second frequency shift signal from the switch 4e of the trigger generating unit 4, the second modulation unit 5c shifts the optical frequency $f_0$ of the light pulse to the optical frequency $f_0+f_{IF2}$ according to the second frequency shift signal, thereby generating the light pulse $P_2$ having the optical frequency $f_0+f_{IF2}$.

The second modulation unit 5c outputs the light pulse $P_2$ to the optical multiplexing unit 5d.

Upon receiving the light pulse $P_1$ from the first modulation unit 5b, the optical multiplexing unit 5d outputs the light pulse $P_1$ to the transmission-side optical system 7.

As the period Trep elapses after the light pulse $P_1$ is received from the first modulation unit 5b, upon receiving the light pulse $P_2$ from the second modulation unit 5c, the optical multiplexing unit 5d outputs the light pulse $P_2$ to the transmission-side optical system 7.

The lidar device in which the pulse modulator 5 includes the optical branching unit 5a, the first modulation unit 5b, the second modulation unit 5c, and the optical multiplexing unit 5d can calculate the moving speed of each observation target regardless of whether or not the moving speed of the far observation target and the moving speed of the near observation target are the same even in a state where the far scattered light and the near scattered light overlap each other, similarly to the lidar device illustrated in FIG. 1.

Third Embodiment

In a third embodiment, a lidar device including a scanner 61 and a switching speed control unit 62 will be described.

Figure 14:
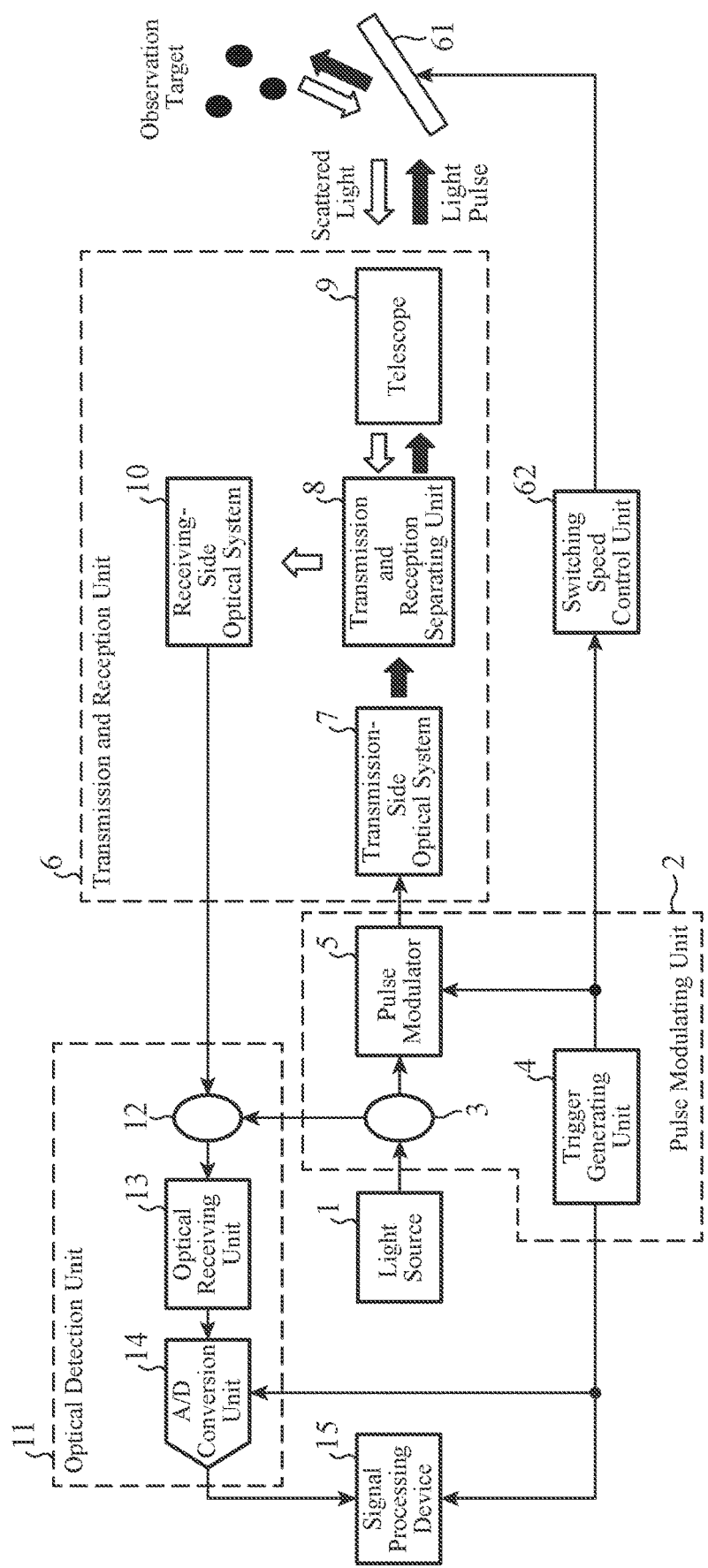
FIG. 14 is a configuration diagram illustrating a lidar device according to a third embodiment.

FIG. 14 is a configuration diagram illustrating a lidar device according to the third embodiment. In FIG. 14, the same reference numerals as those in FIG. 1 denote the same or corresponding parts, and thus description thereof is omitted.

The scanner 61 switches the radiation directions of the light pulses $P_1$ and $P_2$ radiated from the telescope 9 of the transmission and reception unit 6.

That is, the scanner 61 scans the scanning range of each of the light pulses $P_1$ and $P_2$ by temporally sweeping the optical axis of each of the light pulses $P_1$ and $P_2$ radiated from the telescope 9.

The switching speed control unit 62 controls the switching speed in the radiation direction by the scanner 61.

That is, the switching speed control unit 62 controls the switching speed according to the repetition frequency of the light pulse $P_1$ and the light pulse $P_2$ so that the light pulses $P_1$ and $P_2$ radiated by the transmission and reception unit 6 satisfy an eye-safe condition.

Next, the operation of the lidar device illustrated in FIG. 14 will be described. Since the components other than the scanner 61 and the switching speed control unit 62 are similar to those of the lidar device illustrated in FIG. 1, only the operations of the scanner 61 and the switching speed control unit 62 will be described here.

In a case where the lidar device illustrated in FIG. 14 radiates the light pulses $P_1$ and $P_2$ so as to satisfy the eye-safe condition, the power of each of the light pulses $P_1$ and $P_2$ and the scan speed in the scanning range in each of the light pulses $P_1$ and $P_2$ are limited.

Therefore, if the period Trep of the laser beam radiated from the lidar device illustrated in FIG. 14 is shortened, it is possible to increase the scan speed $V_{scan}$ in the scanning range in each of the pulse beams $P_1$ and $P_2$. On the other hand, if the period Trep of the laser beam radiated from the lidar device illustrated in FIG. 14 is lengthened, it is necessary to reduce the scan speed $V_{scan}$ in the scanning range in each of the pulse beams $P_1$ and $P_2$.

As an index for determining whether or not the lidar device satisfies the eye-safe condition, an accessible emission limit AEL of the pulse laser may be used (see, for example, Non-Patent Literature 1).

Non-Patent Literature 1:

"Laser Safety Guidebook", edited by Optical Industry and Technology Development Association, 2006, published by New Technology Communications Co., Ltd.

The wavelengths of the light pulses $P_1$ and $P_2$ radiated from the lidar device illustrated in FIG. 14 are, for example, 1.5 μm band.

In the case of a pulse laser with a wavelength in the 1.5 μm band, the exposure amount for a single pulse is $8\times10^{-3}$ [J].

When a pulse laser in the 1.5 μm wavelength band with an emission duration of 3 seconds or less scans the emitted pulse laser, the time reference T is defined by the time at which D crosses the circular aperture stop of 1 [mm].

The time reference T is expressed as the following Formula (5).

$$T = \frac{1 \times 10^{-3}}{v_{scan}} \quad (5)$$

The total number of pulses Total of the pulse laser included in the time reference T is expressed by Total=frep× T. frep=1/Trep.

In addition, the energy per pulse Epulse=Power×Trep should not exceed the accessible emission limit AELs for a single pulse multiplied by the correction coefficient K depending on the total number of pulses Total, as shown in the following Formula (6). The correction coefficient K is an already-made value.

$$\text{Epulse} < \text{AELs} \times K \quad (6)$$

Therefore, in order for each of the light pulses $P_1$ and $P_2$ radiated from the lidar device illustrated in FIG. 14 to satisfy the eye-safe condition, the repetition frequency frep and the scan speed $V_{scan}$ need to satisfy the following Relational Expression (7).

$$K = \frac{1}{\text{Total}^{-\frac{1}{4}}} = \left(\frac{1}{f_{rep} \times T}\right)^{-1/4} = \left(\frac{v_{scan}}{f_{rep} \times 1 \times 10^{-3}}\right)^{-1/4} \quad (7)$$

The switching speed control unit 62 acquires frequency information indicating the repetition frequency frep, and substitutes the repetition frequency frep indicated by the frequency information and the correction coefficient K into the relational expression (7) to calculate the scan speed $V_{scan}$ satisfying the eye-safe condition.

The switching speed control unit 62 generates a scanner drive signal for achieving the scanning speed $V_{scan}$, and outputs the scanner drive signal to the scanner 61.

When the repetition frequency frep of the light pulse radiated from the lidar device illustrated in FIG. 14 is lowered, the switching speed control unit 62 generates a scanner drive signal for increasing the scan speed $V_{scan}$.

When the repetition frequency frep of the light pulse radiated from the lidar device illustrated in FIG. 14 is increased, the switching speed control unit 62 generates a scanner drive signal for reducing the scan speed $V_{scan}$.

The scan speed $V_{scan}$ of the scanner 61 is controlled by a scanner drive signal output from the switching speed control unit 62.

The scanner 61 switches the radiation direction of each of the light pulses $P_1$ and $P_2$ radiated from the telescope 9 of the transmission and reception unit 6 at the scan speed $V_{scan}$.

In the third embodiment described above, the lidar device illustrated in FIG. 14 is configured to include the scanner 61 that switches the radiation direction of the light pulse radiated from the transmission and reception unit 6 and the switching speed control unit 62 that controls the switching speed of the radiation direction by the scanner 61 according to the repetition frequency of the light pulse so that the light pulse radiated from the transmission and reception unit 6 satisfies the eye-safe condition. Therefore, the lidar device illustrated in FIG. 14 can calculate the moving speeds of the observation targets regardless of whether or not the moving speed of the far observation target and the moving speed of the near observation target are the same even in a state where the far scattered light and the near scattered light overlap each other, similarly to the lidar device illustrated in FIG. 1. In addition, the lidar device illustrated in FIG. 14 can switch the radiation direction of the light pulse in a state where the light pulse satisfies the eye-safe condition.

Fourth Embodiment

In a fourth embodiment, a lidar device including a light source 71 in which an observation target is a gas and which sequentially outputs a first laser beam having a wavelength included in an absorption wavelength band of the gas and a second laser beam having a lower absorption rate by the gas than that of the first laser beam will be described.

In the fourth embodiment, it is assumed that a gas that is a gas to be observed (hereinafter referred to as "observation target gas") is present in the air in which the lidar device is disposed. However, this is merely an example, and the observation target gas may not be present in the air in which the lidar device is disposed, and the observation target gas may be present in another space via a window or the like.

The observation target gas corresponds to, for example, a constituent molecule in the atmosphere. The constituent molecule in the atmosphere is nitrogen, oxygen, carbon dioxide, or water vapor. The constituent molecules in the air also include air pollutants such as nitrogen oxides (NOx). In the lidar device, the absorption wavelength band of the gas is an already-made value. The observation target gas includes a scatterer. The scatterer corresponds to a cloud, smoke, dust, aerosol, raindrops, or the like.

The signal processing device 15 according to the fourth embodiment includes a density calculating unit 72 that calculates the density of the gas from the frequency of the detection signal when the light source 71 outputs the first laser beam and the frequency of the detection signal when the light source 71 outputs the second laser beam.

Figure 15:
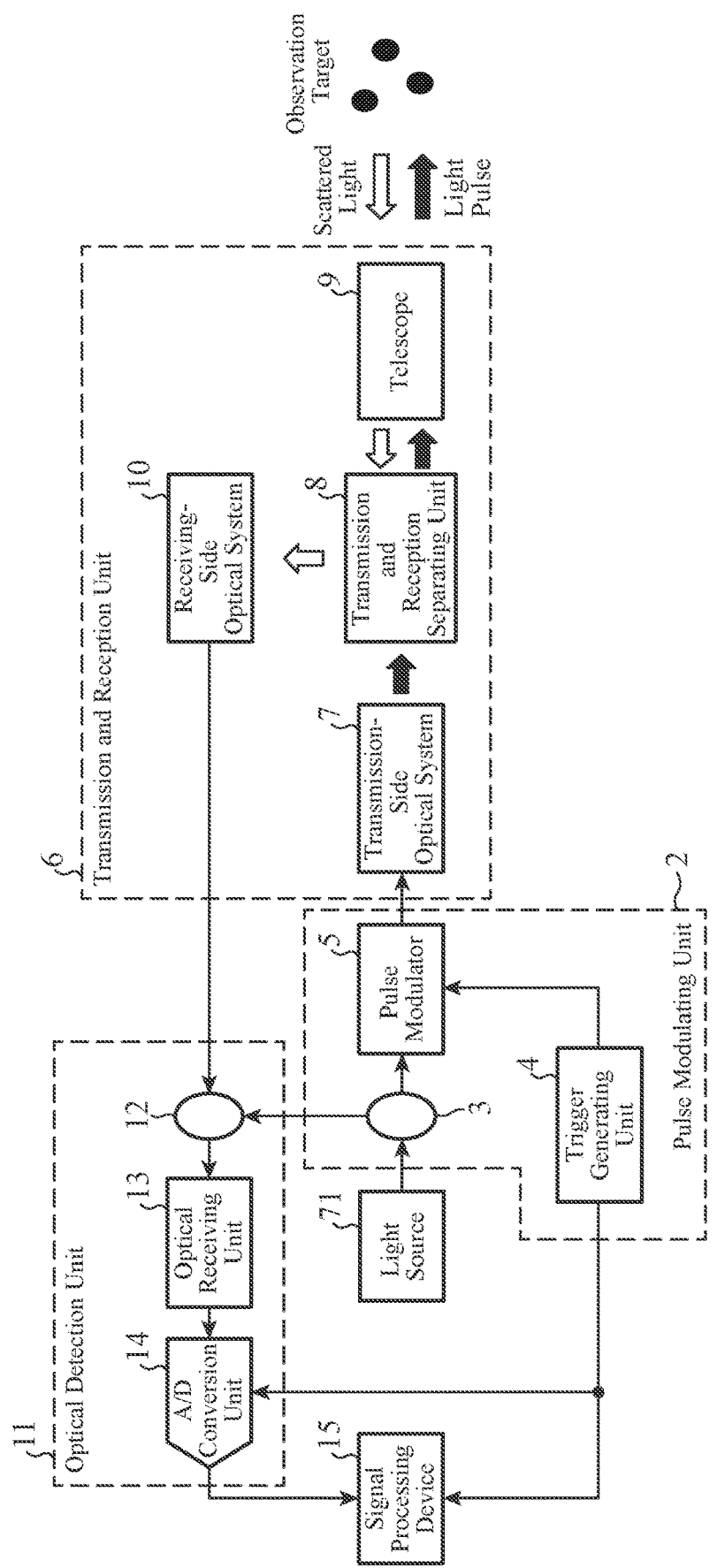
FIG. 15 is a configuration diagram illustrating a lidar device including a signal processing device 15 according to a fourth embodiment.

FIG. 15 is a configuration diagram illustrating a lidar device including the signal processing device 15 according to the fourth embodiment. In FIG. 15, the same reference numerals as those in FIG. 1 denote the same or corresponding parts, and thus description thereof is omitted.

Figure 16:
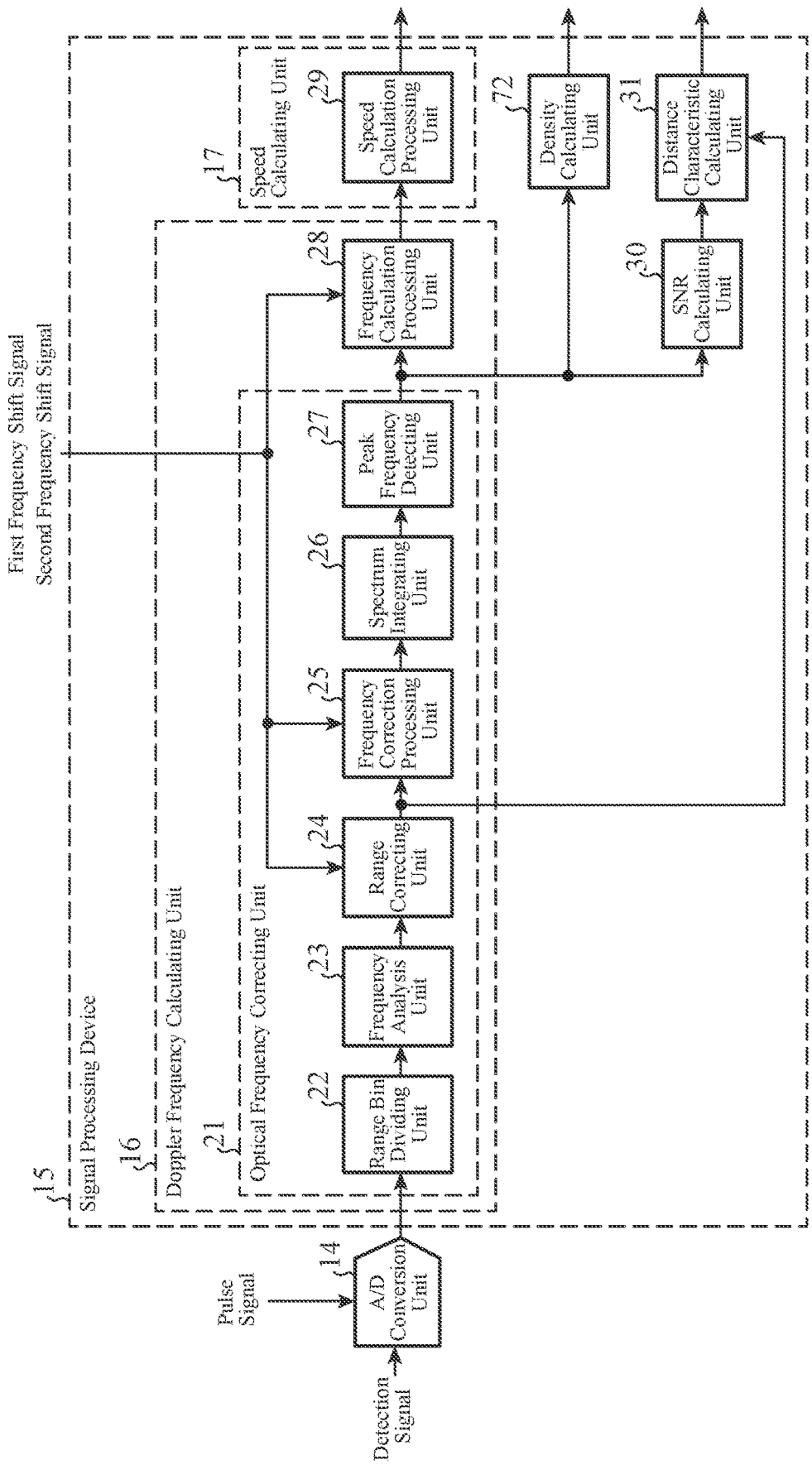
FIG. 16 is a configuration diagram illustrating the signal processing device 15 according to the fourth embodiment.
Figure 17:
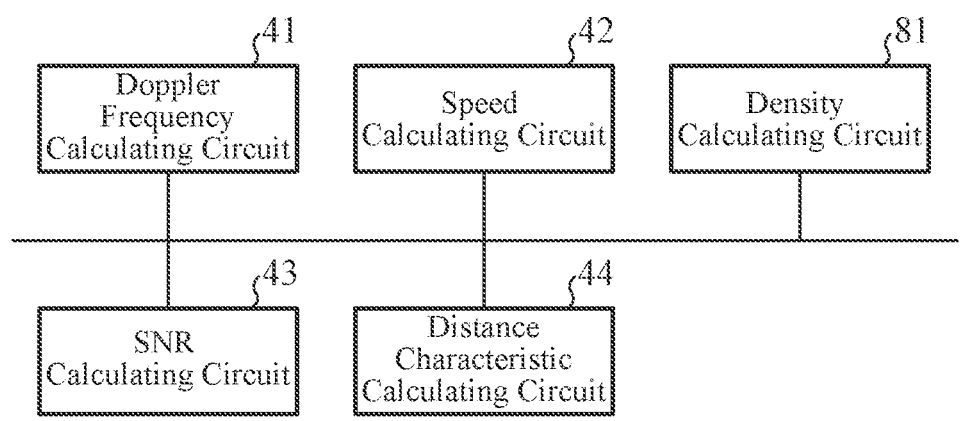
FIG. 17 is a hardware configuration diagram illustrating hardware of the signal processing device 15 according to the fourth embodiment.

FIG. 16 is a configuration diagram illustrating a signal processing device 15 according to the fourth embodiment. FIG. 17 is a hardware configuration diagram illustrating hardware of the signal processing device 15 according to the fourth embodiment.

In FIGS. 16 and 17, the same reference numerals as those in FIGS. 3 and 4 denote the same or corresponding parts, and thus description thereof is omitted.

The light source 71 is, for example, a laser that emits a laser beam of a single frequency, and is implemented by a semiconductor laser, a fiber laser, or a solid-state laser whose emission spectrum has a line width of several MHz or less. Alternatively, the light source 71 is implemented by a combination of one or more lasers among a semiconductor laser, a fiber laser, and a solid-state laser.

The light source 71 sequentially outputs the first laser beam having a wavelength included in the absorption wavelength band of the gas and the second laser beam having a lower absorption rate by the gas than that of the first laser beam to the light division unit 3 of the pulse modulating unit 2.

The density calculating unit 72 is implemented by, for example, a density calculating circuit 81 illustrated in FIG. 17.

The density calculating unit 72 analyzes the frequencies of the detection signals $D_1$ to $D_4$ output from the optical detection unit 11 when the first laser beam is output from the light source 71, and analyzes the frequencies of the detection signals $D_1$ to $D_4$ output from the optical detection unit 11 when the second laser beam is output from the light source 71.

The density calculating unit 72 calculates the density, den, of the gas from the analysis result of each frequency.

In FIG. 16, it is assumed that each of the Doppler frequency calculating unit 16, the speed calculating unit 17, the SNR calculating unit 30, the distance characteristic calculating unit 31, and the density calculating unit 72, which are components of the signal processing device 15, is implemented by dedicated hardware as illustrated in FIG. 17. That is, it is assumed that the signal processing device 15 is implemented by the Doppler frequency calculating circuit 41, the speed calculating circuit 42, the SNR calculating circuit 43, the distance characteristic calculating circuit 44, and the density calculating circuit 81.

Each of the Doppler frequency calculating circuit 41, the speed calculating circuit 42, the SNR calculating circuit 43, the distance characteristic calculating circuit 44, and the density calculating circuit 81 corresponds to, for example, a single circuit, a composite circuit, a programmed processor, a parallel-programmed processor, ASIC, FPGA, or a combination thereof.

The components of the signal processing device 15 are not limited to those implemented by dedicated hardware, and the signal processing device 15 may be implemented by software, firmware, or a combination of software and firmware.

In a case where the signal processing device 15 is implemented by software, firmware, or the like, a program for causing a computer to execute processing procedures in the Doppler frequency calculating unit 16, the speed calculating unit 17, the SNR calculating unit 30, the distance characteristic calculating unit 31, and the density calculating unit 72 is stored in the memory 51 illustrated in FIG. 5. Then, the processor 52 illustrated in FIG. 5 executes the program stored in the memory 51.

Furthermore, FIG. 17 illustrates an example in which each of the components of the signal processing device 15 is implemented by dedicated hardware, and FIG. 5 illustrates an example in which the signal processing device 15 is implemented by software, firmware, or the like. However, this is merely an example, and some components in the signal processing device 15 may be implemented by dedicated hardware, and the remaining components may be implemented by software, firmware, or the like.

The operation of the lidar device illustrated in FIG. 15 will be described. Since the components other than the light source 71 and the density calculating unit 72 are the same as those of the lidar device illustrated in FIG. 1, the operation of the light source 71 and the density calculating unit 72 will be mainly described here.

First, the light source 71 outputs a first laser beam having a wavelength included in an absorption wavelength band of gas to the light division unit 3 of the pulse modulating unit 2. The optical frequency of the first laser beam output from the light source 71 is $f_{O,4}$.

When the first laser beam is output from the light source 71, the optical detection unit 11 detects multiplexed light beams of the scattered light beams $R_1$, $R_2$, $R_3$, and $R_4$ received by the transmission and reception unit 6 and the reference light which is the laser beam output from the light source 1 as in the first embodiment.

Here, for convenience of description, the multiplexed light beams detected by the optical detection unit 11 are expressed as $C_{1,4}$, $C_{2,4}$, $C_{3,4}$, and $C_{4,4}$.

The optical detection unit 11 outputs the detection signals $D_{1,4}$, $D_{2,4}$, $D_{3,4}$, and $D_{4,4}$ of the multiplexed lights $C_{1,4}$, $C_{2,4}$, $C_{3,4}$, and $C_{4,4}$ to the signal processing device 15.

Each of the range bin dividing unit 22, the frequency analysis unit 23, the range correcting unit 24, the frequency correction processing unit 25, and the spectrum integrating unit 26 operates similarly to the first embodiment.

The spectrum integrating unit 26 outputs the integrated frequency spectrum to the density calculating unit 72.

Here, for convenience of description, the integrated frequency spectrum output from the spectrum integrating unit 26 is expressed as ΣHFSA.

Next, the light source 71 outputs the second laser beam having a lower absorption rate by gas than that of the first laser beam to the light division unit 3 of the pulse modulating unit 2. The optical frequency of the second laser beam output from the light source 71 is $f_{OB}$.

Figure 18:
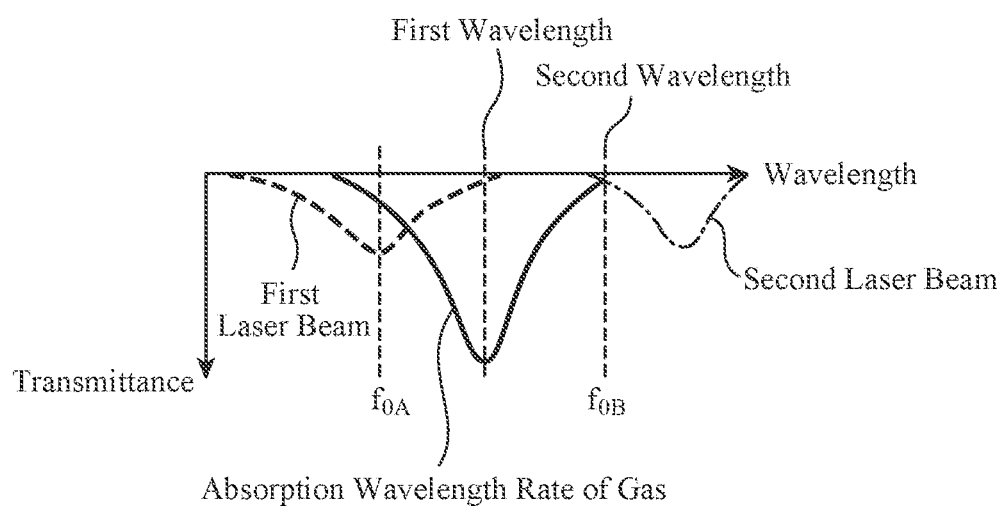
FIG. 18 is an explanatory diagram illustrating an absorption wavelength band of gas, a wavelength of a first laser beam output from a light source 71, and a wavelength of a second laser beam output from the light source 71.

FIG. 18 is an explanatory diagram illustrating an absorption wavelength band of gas, a wavelength of the first laser beam output from the light source 71, and a wavelength of the second laser beam output from the light source 71.

In FIG. 18, the horizontal axis represents the wavelength, and the vertical axis represents the transmittance of the laser beam to the gas.

A broken line indicates the first laser beam output from the light source 71, and an alternate long and short dash line indicates the second laser beam output from the light source 71. The solid line indicates an absorption wavelength band of the gas. The first wavelength is included in the absorption wavelength band of the gas, and the second wavelength is not included in the absorption wavelength band of the gas. The transmittance of the second wavelength by the gas is greater than the transmittance of the first wavelength by the gas. That is, the absorption rate of the second wavelength by the gas is smaller than the absorption rate of the first wavelength by the gas.

When the second laser beam is output from the light source 71, the optical detection unit 11 detects multiplexed light beams of the scattered light beams $R_1$, $R_2$, $R_3$, and $R_4$ received by the transmission and reception unit 6 and the reference light, which is the laser beam output from the light source 1, similarly to the first embodiment.

Here, for convenience of description, the multiplexed light beams detected by the optical detection unit 11 are expressed as $C_{1B}$, $C_{2B}$, $C_{3B}$, and $C_{4B}$.

The optical detection unit 11 outputs the detection signals $D_{1B}$, $D_{2B}$, $D_{3B}$, and $D_{4B}$ of the multiplexed light beams $C_{1B}$, $C_{2B}$, $C_{3B}$, and $C_{4B}$ to the signal processing device 15.

The density calculating unit 72 analyzes the frequencies of the detection signals $D_{1A}$ to $D_{4A}$ output from the optical detection unit 11 when the first laser beam is output from the light source 71, and analyzes the frequencies of the detection signals $D_1$ to $D_4$ output from the optical detection unit 11 when the second laser beam is output from the light source 71.

The density calculating unit 72 calculates the density, den, of the gas from the analysis result of each frequency.

Hereinafter, the calculation processing of the density, den, by the density calculating unit 72 will be specifically described.

The density calculating unit 72 acquires, from the optical frequency correcting unit 21, spectral intensities $FS_{max1}$ and $FS_{max2}$ when the first laser beam is output from the light source 71. Here, for convenience of description, the spectral intensities acquired by the density calculating unit 72 are expressed as $FS_{max1A}$ ($n_{1A}$) and $FS_{max2A}$ ($n_{2A}$). $n_{1A}$ indicates a range bin of the spectral intensity $FS_{max1A}$, and $n_{2A}$ indicates a range bin of the spectral intensity $FS_{max2A}$.

In addition, the density calculating unit 72 acquires, from the optical frequency correcting unit 21, the spectral intensities $FS_{max1}$ and $FS_{max2}$ when the second laser beam is output from the light source 71. Here, for convenience of description, the spectral intensities acquired by the density calculating unit 72 are expressed as $FS_{max1B}$ ($n_{1B}$) and $FS_{max2B}$ ($n_{2B}$). $n_{1B}$ indicates a range bin of the spectral intensity $FS_{max1B}$, and $n_{2B}$ indicates a range bin of the spectral intensity $FS_{max2B}$.

In the signal processing device 15 illustrated in FIG. 16, the density calculating unit 72 acquires the spectral intensities $FS_{max1A}$ ($n_{1A}$), $FS_{max2A}$ ($n_{2A}$), $FS_{max1B}$ ($n_{1B}$), and $FS_{max2B}$ ($n_{2B}$) from the optical frequency correcting unit 21. However, this is merely an example, and if the density calculating unit 72 includes an optical frequency correcting unit similar to the optical frequency correcting unit 21, the spectral intensities $FS_{max1A}$ ($n_{1A}$), $FS_{max2A}$ ($n_{2A}$), $FS_{max1B}$ ($n_{1B}$), and $FS_{max2B}$ ($n_{2B}$) may be acquired from the optical frequency correcting unit.

The density calculating unit 72 calculates the density, den, of the gas by substituting the spectral intensities $FS_{max1A}$ ($n_{1A}$), $FS_{max2A}$ ($n_{2A}$), $FS_{max1B}$ ($n_{1B}$), and $FS_{max2B}$ ($n_{2B}$) into the following Formula (8).

$$den = \frac{1}{2 \cdot |n_{1A} - n_{1B}| \cdot (k_{ON} - k_{OFF})} \cdot \ln\left[\frac{FS_{max2B}(n_{2B})}{FS_{max1B}(n_{1B})} \cdot \frac{FS_{max1A}(n_{1A})}{FS_{max2A}(n_{2A})}\right] \quad (8)$$

In Formula (8), $k_{ON}$ is an absorption coefficient of a wavelength of the first laser beam, and is an already-valued coefficient. $k_{OFF}$ is an absorption coefficient of a wavelength of the second laser beam, and is an already-valued coefficient. ln is a mathematical symbol indicating a logarithmic function with a base of e.

In the fourth embodiment described above, the observation target is a gas, and the light source 71 sequentially outputs the first laser beam having a wavelength included in an absorption wavelength band of the gas and the second laser beam having a lower absorption rate by the gas than that of the first laser beam. The lidar device illustrated in FIG. 15 is configured to include the density calculating unit 72 that analyzes the frequency of each detection signal output from the optical detection unit 11 when the first laser beam is output from the light source 71, analyzes the frequency of each detection signal output from the optical detection unit 11 when the second laser beam is output from the light source 71, and calculates the density of the gas from the analysis result of each frequency. Therefore, the lidar device illustrated in FIG. 15 can calculate the moving speeds of the observation targets regardless of whether or not the moving speed of the far observation target and the moving speed of the near observation target are the same even in a state where the far scattered light and the near scattered light overlap each other, similarly to the lidar device illustrated in FIG. 1. In addition, the lidar device illustrated in FIG. 15 can calculate the density of the gas to be observed.

Note that, in the present disclosure, it is possible to freely combine each embodiment, to modify any components of each embodiment, or to omit any components in each embodiment.

INDUSTRIAL APPLICABILITY

The present disclosure is suitable for a signal processing device, a signal processing method, and a lidar device.

REFERENCE SIGNS LIST

1: light source, 2: pulse modulating unit, 3: light division unit, 4: trigger generating unit, 4a: pulse signal generating unit, 4b: reference signal generating unit, 4c: first shift signal generating unit, 4d: second shift signal generating unit, 4e: switch, 5: pulse modulator, 5a: optical branching unit, 5b: first modulation unit, 5c: second modulation unit, 5d: optical multiplexing unit, 6: transmission and reception unit, 7: transmission-side optical system, 8: transmission and reception separating unit, 9: telescope, 10: receiving-side optical system, 11: optical detection unit, 12: optical multiplexing unit, 13: optical receiving unit, 14: A/D conversion unit, 15: signal processing device, 16: Doppler frequency calculating unit, 17: speed calculating unit, 21: optical frequency correcting unit, 22: range bin dividing unit, 23: frequency analysis unit, 24: range correcting unit, 25: frequency correction processing unit, 26: spectrum integrating unit, 27: peak frequency detecting unit, 28: frequency calculation processing unit, 29: speed calculation processing unit, 30: SNR calculating unit, 31: distance characteristic calculating unit, 41: Doppler frequency calculating circuit, 42: speed calculating circuit, 43: SNR calculating circuit, 44: distance characteristic calculating circuit, 51: memory, 52: processor, 61: scanner, 62: switching speed control unit, 71: light source, 72: density calculating unit, 81: density calculating circuit

The invention claimed is:

1. A signal processing device that calculates, as a moving speed of each of a plurality of observation targets present in a space, a relative speed of each of the observation targets with respect to a lidar device, wherein
a plurality of light pulses having different optical frequencies are generated from a laser beam output from a light source, each of the light pulses radiated to the space and then scattered by each of the observation targets is received as scattered light, and multiplexed light of the scattered light and the laser beam is detected, and
the signal processing device comprises:
a Doppler frequency calculator to calculate a Doppler frequency that is due to movement of each of the observation targets; and
a speed calculator to calculate a relative speed of each of the observation targets from each of the Doppler frequency calculated by the Doppler frequency calculator, wherein
the Doppler frequency calculator includes:
an optical frequency corrector to correct an optical frequency of each of the multiplexed lights associated with the observation targets, on a basis of a frequency difference between an optical frequency of one light pulse and an optical frequency of the remaining light pulse among the plurality of generated light pulses; and
a frequency calculation processor to calculate a Doppler frequency included in an optical frequency of each of the scattered light from an optical frequency of each of the multiplexed light corrected by the optical frequency corrector and an optical frequency of each of the generated light pulses.

2. The signal processing device according to claim 1, wherein
the Doppler frequency calculator includes
a spectrum integrator to integrate frequency spectra of a plurality of multiplexed light beams after optical frequency correction by the optical frequency corrector, and
the frequency calculation processor specifies an optical frequency of each of the multiplexed light beams from the frequency spectrum integrated by the spectrum integrator, and calculates a Doppler frequency included in an optical frequency of each of the scattered light from an optical frequency of each of the multiplexed light beams and an optical frequency of each of the generated light pulses.

3. A signal processing method that calculates, as a moving speed of each of a plurality of observation targets present in a space, a relative speed of each of the observation targets with respect to a lidar device, wherein
a plurality of light pulses having different optical frequencies from each other are generated from a laser beam output from a light source, each of the light pulses radiated to the space and then scattered by each of the observation targets is received as scattered light, and multiplexed light of the scattered light and the laser beam is detected, and
the signal processing method comprises:
correcting an optical frequency of each of the multiplexed lights associated with the observation targets, on a basis of a frequency difference between an optical frequency of one light pulse and an optical frequency of the remaining light pulse among the plurality of generated light pulses;
calculating a Doppler frequency included in an optical frequency of each of the scattered light from an optical frequency of each of the multiplexed light corrected and an optical frequency of each of the generated light pulses; and
calculating a relative speed of each of the observation targets from each of the Doppler frequency calculated.

4. A lidar device that calculates, as a moving speed of each of a plurality of observation targets present in a space, a relative speed of each of the observation targets with respect to a lidar device, the lidar device comprising:
a light source to output a laser beam;
a pulse modulator to generate a plurality of light pulses having different optical frequencies from each other from the laser beam output from the light source;
a transmitter and receptor to radiate each of the light pulses generated by the pulse modulator to the space and receive each of the light pulses scattered by each of the observation targets as scattered light;
an optical detector to detect multiplexed light of each of the scattered light received by the transmitter and receptor and the laser beam output from the light source and output a detection signal of each of the multiplexed light;
a Doppler frequency calculator to calculate a Doppler frequency that is due to movement of each of the observation targets; and
a speed calculator to calculate a relative speed of each of the observation targets from the Doppler frequency calculated by the Doppler frequency calculator, wherein
the Doppler frequency calculator includes:
an optical frequency corrector to correct an optical frequency of each of the multiplexed lights associated with the observation targets, on a basis of a frequency difference between an optical frequency of one light pulse and an optical frequency of the remaining light pulse among the plurality of generated light pulses; and
a frequency calculation processor to calculate a Doppler frequency included in an optical frequency of each of the scattered light from an optical frequency of each of the multiplexed light corrected by the optical frequency corrector and an optical frequency of each of the generated light pulses.

5. The lidar device according to claim 4, further comprising:
a scanner to switch a radiation direction of light pulse radiated from the transmitter and receptor; and
a switching speed controller to control a switching speed of the radiation direction by the scanner.

6. The lidar device according to claim 5, wherein the switching speed controller controls the switching speed according to a repetition frequency of the light pulse radiated from the transmitter and receptor so that the light pulse radiated from the transmitter and receptor satisfies an eye-safe condition.

7. The lidar device according to claim 4, wherein
the observation target is a gas, and
the light source sequentially outputs a first laser beam having a wavelength included in an absorption wavelength band of the gas and a second laser beam having a lower absorption rate by the gas than that of the first laser beam to the pulse modulator.

8. The lidar device according to claim 7, further comprising a density calculator to analyze a frequency of each of the detection signal output from the optical detector when the first laser beam is output from the light source, analyze a frequency of each of the detection signal output from the optical detector when the second laser beam is output from the light source, and calculate a density of the gas from an analysis result of each of the from each of the Doppler frequency calculated by the Doppler frequency calculator.

* * * * *